United States Patent [19]

Someya et al.

[11] Patent Number: 4,525,054
[45] Date of Patent: Jun. 25, 1985

[54] CAMERA

[75] Inventors: Hiromi Someya, Kanagawa; Yoshihiko Aihara, Tokyo; Toyokazu Mizogui; Nobuyuki Suzuki, both of Kanagawa, all of Japan

[73] Assignee: Canon Kabushiki Kaisha, Tokyo, Japan

[21] Appl. No.: 621,494

[22] Filed: Jun. 18, 1984

[30] Foreign Application Priority Data

Jun. 20, 1983 [JP] Japan ............................... 58-111717
Jun. 20, 1983 [JP] Japan ............................... 58-111718
Jun. 20, 1983 [JP] Japan ............................... 58-111719
Jun. 20, 1983 [JP] Japan ............................... 58-111720

[51] Int. Cl.³ ............................................. G03B 7/087
[52] U.S. Cl. ................................ 354/443; 354/238.1; 354/289.1
[58] Field of Search ................. 354/441–446, 354/237, 238.1, 239, 240, 289.1, 289.12

[56] References Cited

U.S. PATENT DOCUMENTS

| 4,222,645 | 9/1980 | Imura et al. | 354/239 X |
| 4,297,012 | 10/1981 | Nakai et al. | 354/238.1 X |
| 4,312,579 | 1/1982 | Araki et al. | 354/443 |
| 4,358,188 | 9/1982 | Uchidoi et al. | 354/443 |
| 4,468,109 | 8/1984 | Maida | 354/442 |

Primary Examiner—William B. Perkey
Attorney, Agent, or Firm—Toren, McGeady, Stanger

[57] ABSTRACT

The disclosed camera permits selection of one exposure control mode along one program line based on brightness and at least another control mode along another program line. An operation control selects the one mode when self-timer photography is not used, and the other mode for self-timer photography. The self-timer exposure control is performed at an aperture value or a shutter time value particularly suitable for self-timer photography.

8 Claims, 14 Drawing Figures

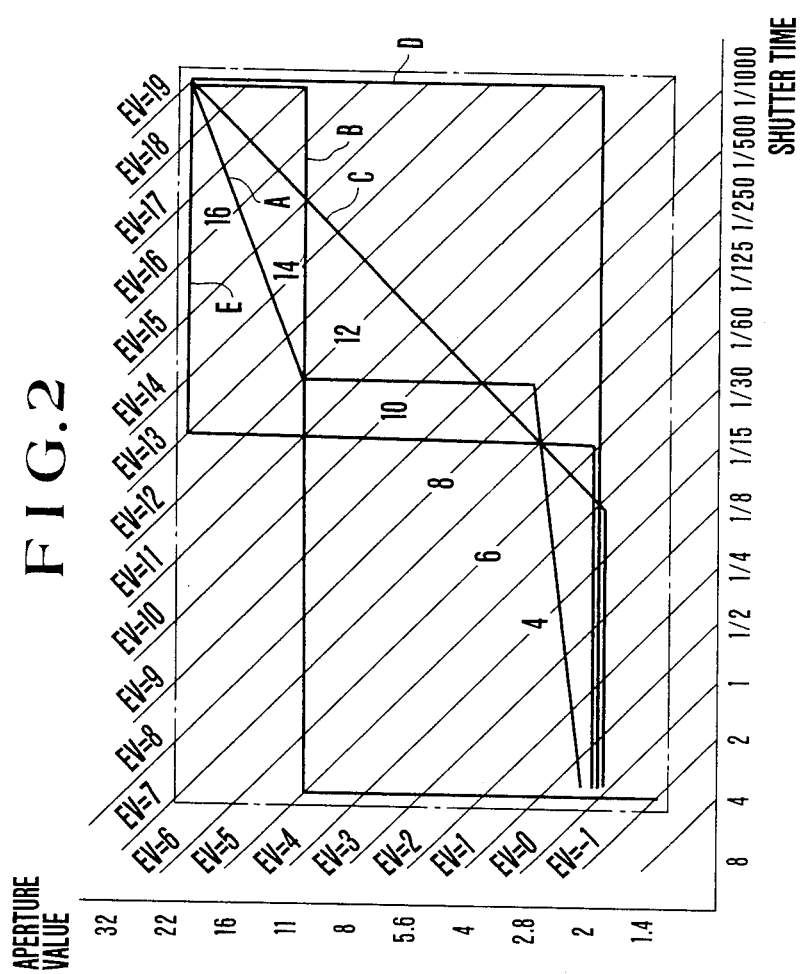

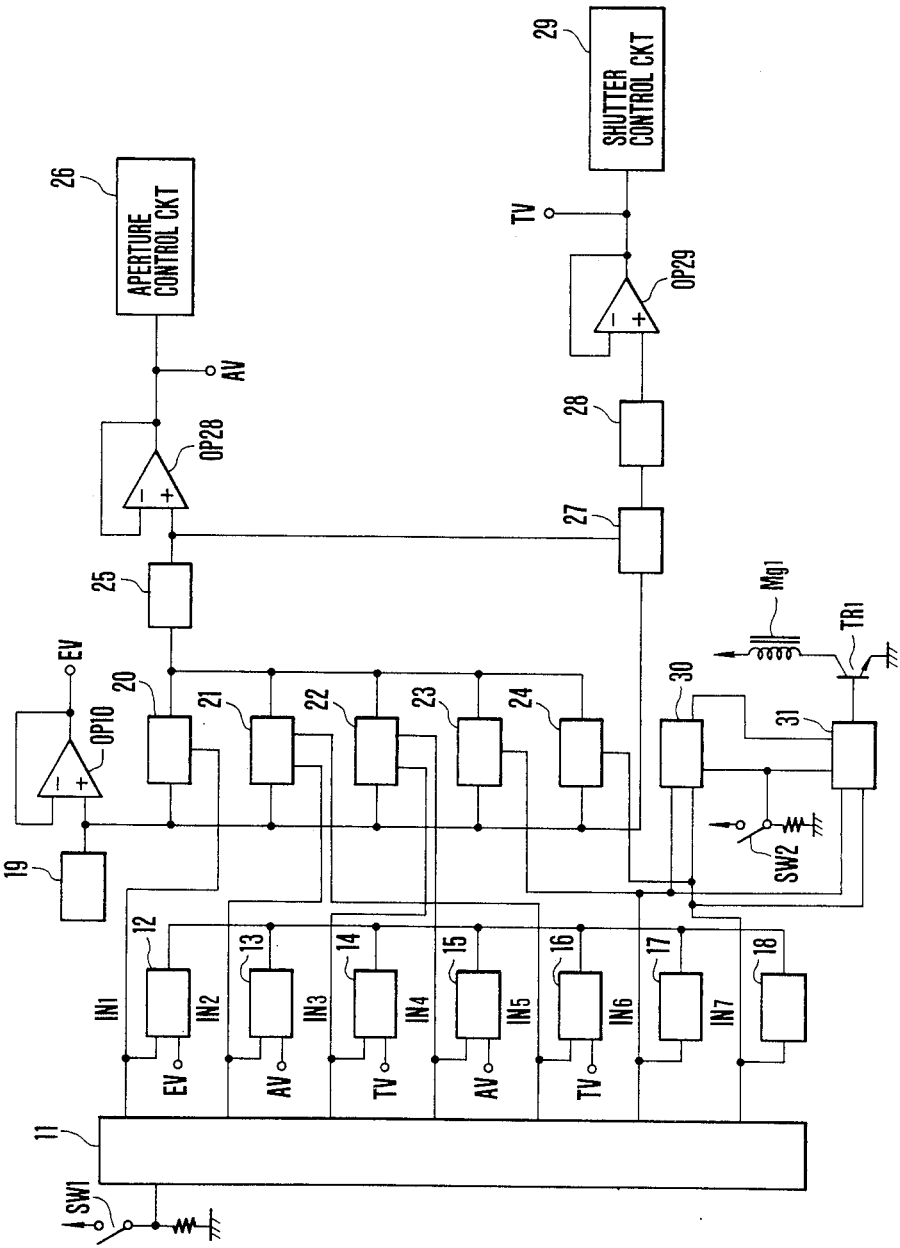
F I G. 4

CAMERA

BACKGROUND OF THE INVENTION

1. Field of the Invention

This invention relates to a photographic camera and more particularly to a camera which permits self-timer photography.

2. Description of the Prior Art

Cameras capable of selecting various photographing modes have been developed during recent years. In carrying out self-timer photography with a camera of this kind, exposure control is performed in the selected photographing mode. For example, if a mode in which a maximum aperture has priority is selected for carrying out a self-timer photographing operation, the aperture is controlled to be on the side of the maximum or full-open aperture.

Self-timer photography is often performed with the lens focused on a background as well as on two to ten odd persons. Accordingly, the aperture of the lens is generally stopped down for self-timer photography. In the light of this, the above-stated selection of a photographing mode is not suitable for self-timer photography.

SUMMARY OF THE INVENTION

It is an object of the present invention to provide a camera of the type having various photographing (exposure control) modes, wherein, when a self-timer photographing mode is selected, exposure control is accomplished in an exposure control mode suited for self-timer photography.

It is another object of this invention to provide a camera wherein there are provided a normal self-timer mode and another self-timer mode which is arranged to have a shorter self-timer operation time than the normal self-timer mode; when each of these self-timer modes is selected, photographing is carried out in an exposure control mode suited for the self-timer mode selected.

These and further object and features of the invention will become apparent from the following detailed description of the preferred embodiments thereof taken in connection with the accompanying drawings.

BRIEF DESCRIPTION OF THE DRAWINGS

FIG. 2 is a program diagram of the camera of FIG. 1.

FIG. 4 shows the control circuit of the camera of FIG. 1.

DETAILED DESCRIPTION OF THE PREFERRED EMBODIMENTS

Figure 1:
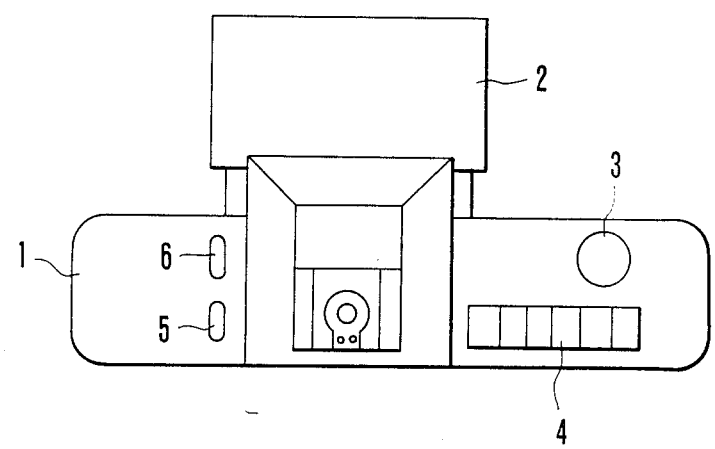
FIG. 1 is a plan view showing a multi-programed automatic exposure control camera arranged as an embodiment of the present invention.

Referring to the accompanying drawings, a preferred embodiment of this invention is arranged as follows: FIG. 1 shows a multi-mode automatic exposure camera embodying the invention as in a state of being viewed from above. The camera includes a camera body 1; a lens body 2 which is attachable to and detachable from the camera body 1; a release button 3; an exposure control mode display part 4 which consists of members made of a material such as liquid crystal that permits electrical control over the transmission factor thereof; an exposure control mode selection button 5 which serves as switch for shifting one exposure control mode to another; and a light measuring button 6 which is provided for light measurement.

FIG. 2 shows the program lines of the multi-mode automatic exposure camera of FIG. 1. In FIG. 2, the axis of ordinate shows aperture vlaues (F-numbers). The axis of obscissa shows shutter time values (T). Oblique axes show exposure values EV (which are light values LV at film sensitivity of ASA 100). Reference symbols A and B denote program lines provided solely for self-timer photography. For self-timer photography, a low shutter speed range can be arranged to be wider than that of the normal shutter speed or time, because the camera is fixed in that instance by some means such as a tripod or the like.

The program line A represents a program for a normal self-timer photographing mode using a self-timer operation time of 10 seconds (hereinafter will be called the 10 sec self-timer mode). In this mode, for a range of exposure values EV=0–8, a straight program line portion spans from a point where the shutter time value is programed to be T=4 in combination with an aperture value of F=2 to another point where the shutter time value is programed to be T=1/30 in combination with an aperture value F=2.8. For another range of exposure values EV=8–12, the shutter time is programed to be at T=1/30 to prevent a blur due to some movement of an object to be photographed while the aperture value is programed to be F=2.8–11. Within the range of exposure values EV=12–19, another straight line portion of the program spans from a point where the shutter time is programed to be at T=1/30 in combination with an aperture value of F=11 in consideration of an image effect to another point where the shutter time is programed to be T=1/1000 in combination with an aperture value of F=22.

The program line B represents a program for another self-timer photographing mode having a self-timer operation time of two seconds (hereinafter will be called the 2 sec self-timer mode) which is provided to substitute for cable release arrangement used for copying, etc. In this case, within an exposure value range of EV=-0-5, the shutter time is programed to be T=4 and the aperture value to be F=2-11. For an exposure value range of EV=5-17, the shutter time is programed to be T=4-1/1000 in combination with an aperture value of F=11 in consideration of an image effect desirable. For an exposure value range of EV=17-19, the shutter time is programed to be T-1/1000 in combination with aperture values F=11-22. A program line C represents a standardized program mode using combinations of frequently used shutter time and aperture values (hereinafter will be called the normal program mode). In the normal program mode, for an exposure value range EV=0-5, the shutter time is programed to be T=4-⅛ in combination with an aperture value of F=2. For exposure values EV=5-19, a straight line spans from a point where the shutter time T is programed to be T=⅛ in combination with an aperture vlaue F=2 to another point where the shutter time is programed to be 1/1000 in combination with an aperture value F=22. Another program line D includes an aperture priority mode using wide opening aperture vlues for exposure values EV ranging from 0 to 13 to make the depth of focus shallow (hereinafter this mode will be called the gradate mode). In the program line D, a shutter priority mode in which a high speed shutter time value is also included for exposure values EV from 11 to 19 (hereinafter this mode will be called the stop motion mode). In this embodiment, the program line D has an aperture value of F=2 programed in combination with shutter time values T=4-1/1000 for the range of exposure values EV=0-12 while a shutter time value of T=1/1000 is programed in combination with aperture values F=2-22. A program line E consists of a shutter priority mode using a low speed shutter time within a range of exposure values EV=5-14 for panning or the like (hereinafter will be called the panning shot mode); and an aperture priority mode in which the lens aperture is stopped down to make the depth of focus deep within another range of exposure values EV=12-19 (hereinafter will be called the pan focus mode). In this embodiment, the program line E has an aperture value F=2 programed in combination with shutter time values T=4-1/15 for an exposure value range EV=0-6; a shutter time value T=1/15 in combination with aperture values F=2-22 for another exposure value range EV=6-13; and an aperture value F=22 in combination with shutter time values T=1/15-1/1000 for a further exposure value range EV=13-19.

Figure 3:
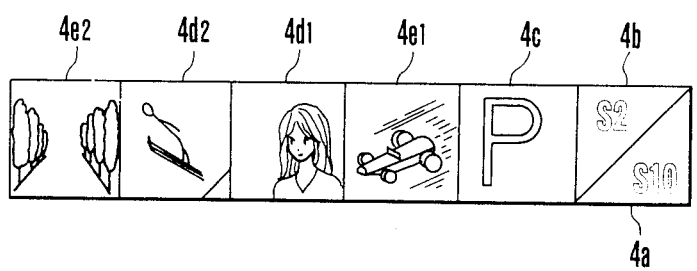
FIG. 3 is a detailed illustration of the pictographs provided in the mode display part of the camera of FIG. 1.

FIG. 3 concretely shows the exposure control mode display part 4 of FIG. 1. The display part is arranged to show in pictographs and symbols the 10 sec self-timer mode (a first self-timer mode) 4a; the 2 sec self-timer mode (a second self-timer mode) 4b; the normal program mode 4c; the gradate mode 4d1; the stop motion mode 4d2; the panning shot mode 4e1; and the pan focus mode 4e2 respectively.

Let us assume that the camera programed as described above has a lens of a maximum aperture F=2 and a minimum aperture F=22 and is loaded with a film of an ASA sensitivity value of 100. Further, let us assume that the focal length of the lens is 50 mm or thereabout. The photographing operation with this camera is as follows: When a main switch (not shown) is turned on, the pictograph display 4c appears at the exposure control mode display part 4. When the exposure control mode selection button 5 is pushed once, the display 4e2 appears at the exposure control mode display part 4 while the display 4c disappears. This indicates a shift of the exposure control mode from the normal program mode to the pan focus mode. Next, when the exposure control mode selection button 5 is pushed once more, the display 4e2 disappears and the pictograph display 4d2 appears to indicate a shift from the pan focus mode to the stop motion mode. With the exposure control mode selection button 5 repeatedly pushed further in the same manner, the exposure control mode shifts in the order of the gradate mode, the panning shot mode, the 2 sec self-timer mode, the 10 sec self-timer mode and the normal program mode. Accordingly, the exposure control mode display part 4 displays the pictographs 4d1, 4e1, 4b, 4a and 4c one after another. If the exposure control mode selection button 5 is continuously depressed, these exposure control modes and the exposure control mode displays are also continuously switched over from one to another.

In case that a desired exposure cannot be effected in the selected mode due to the brightness of an object to be photographed, the exposure control mode display part 4 flickers to inform the photographer of this condition.

FIG. 4 shows the control circuit of the camera of FIG. 1. The circuit arrangement includes a switch SW1 which is arranged to be operated by the selection button 5 shown in FIG. 1. A selection signal generating circuit 11 is arranged to produce signals IN1-IN7 one after another every time the switch SW1 opens and closes. A normal program display driving circuit 12 is arranged to be actuated by the signal IN1. A pan focus program display driving circuit 13 is arranged to be actuated by the signal IN2. A sto motion mode program display driving circuit 14 is arranged to be actuated by the signal IN3. A gradate mode program display driving circuit 15 is arranged to be actuated by the signal IN4. A panning shot mode program display driving circuit 16 is arranged to be actuated by the signal IN5. A 2 sec self-timer mode program display driving circuit 17 is arranged to be actuated by the signal IN6. A 10 sec self-timer mode program display driving circuit 18 is arranged to be actuated by the signal IN7. A photometric or light measuring circuit 19 is arranged to produce an exposure value signal via an operational amplifier OP10. The exposure value signal is arranged to be applied to the normal program display driving circuit 12. A normal program line selection circuit 20 is arranged to be actuated by the signal IN1. A pan focus program line or panning shot program line selection circuit 21 is arranged to be actuated by the signal IN2 or IN5. A stop motion mode line or gradate mode line selection circuit 22 is arranged to be actuated by the signal IN3 or IN4. A 2 sec self-timer mode program line selection circuit 23 is arranged to be actuated by the signal IN6. A 10 sec self-timer mode program line section circuit 24 is arranged to be actuated by the signal IN7. A limiter circuit 25 is arranged to have the outputs of these selection circuits 20-24 applied thereto. The limiter circuit 25 produces a computed aperture value signal AV via an operational amplifier OP28, which is applied to an aperture control circuit 26. The signal AV is applied also to the display driving circuits 13 and 15. A subtraction circuit 27 performs a subtracting operation on the output of the light measuring circuit 19 and that of the limiter circuit 27. The output of the subtraction circuit 27 is applied to a limiter circuit 28. The output terminal of this limiter circuit 28 produces a computed shutter time signal TV via an operational amplifier OP29 and supplies it to a shutter control circuit 29. The signal TV is also supplied to the display driving circuits 14 and 16. A timer circuit 30 is arranged to have the signals IN6 and IN7 supplied thereto. A release driving circuit 31 is arranged to be driven either by a switch SW2 or by the timer circuit 30 and the signals IN6 and IN7. The release driving circuit 31 produces an output which controls a transistor TR1 and drives an electromagnet Mg1. With the circuit arranged in this manner, every time the switch SW1 is closed, one of the signals IN1–IN7 is produced one after another from the selection signal generating circuit 11. When the signal IN1 is produced, for example, the normal program line selection circuit 20 comes to operate. Then, the output of the light measuring circuit 19 is applied to the selection circuit 20. An aperature value computation signal which is obtained according to the normal program line is produced. This computation signal is then subjected to a limiting process at the limiter circuit 25 to make it into an aperture value within a set range. The output of the limiter circuit 25 is applied to the aperture control circuit 26.

The subtraction circuit 27 on the other hand subtracts the aperture value obtained from the limiter circuit 25 from the output of the light measuring circuit 19 to produce a shutter time value TV. The shutter time value signal is thus subjected to a limiting process carried out by the limiter circuit to make it into a signal of a value within a set range of shutter time values. The output thus obtained is applied to the shutter control circuit 29 via the operational amplifier OP29.

When the switch SW2 is closed by an operation on a release button 3, the release control circuit 31 operates to turn on the transistor TR1. This causes the electromagnet Mg1 to be excited and a release operation begins.

Figure 5:
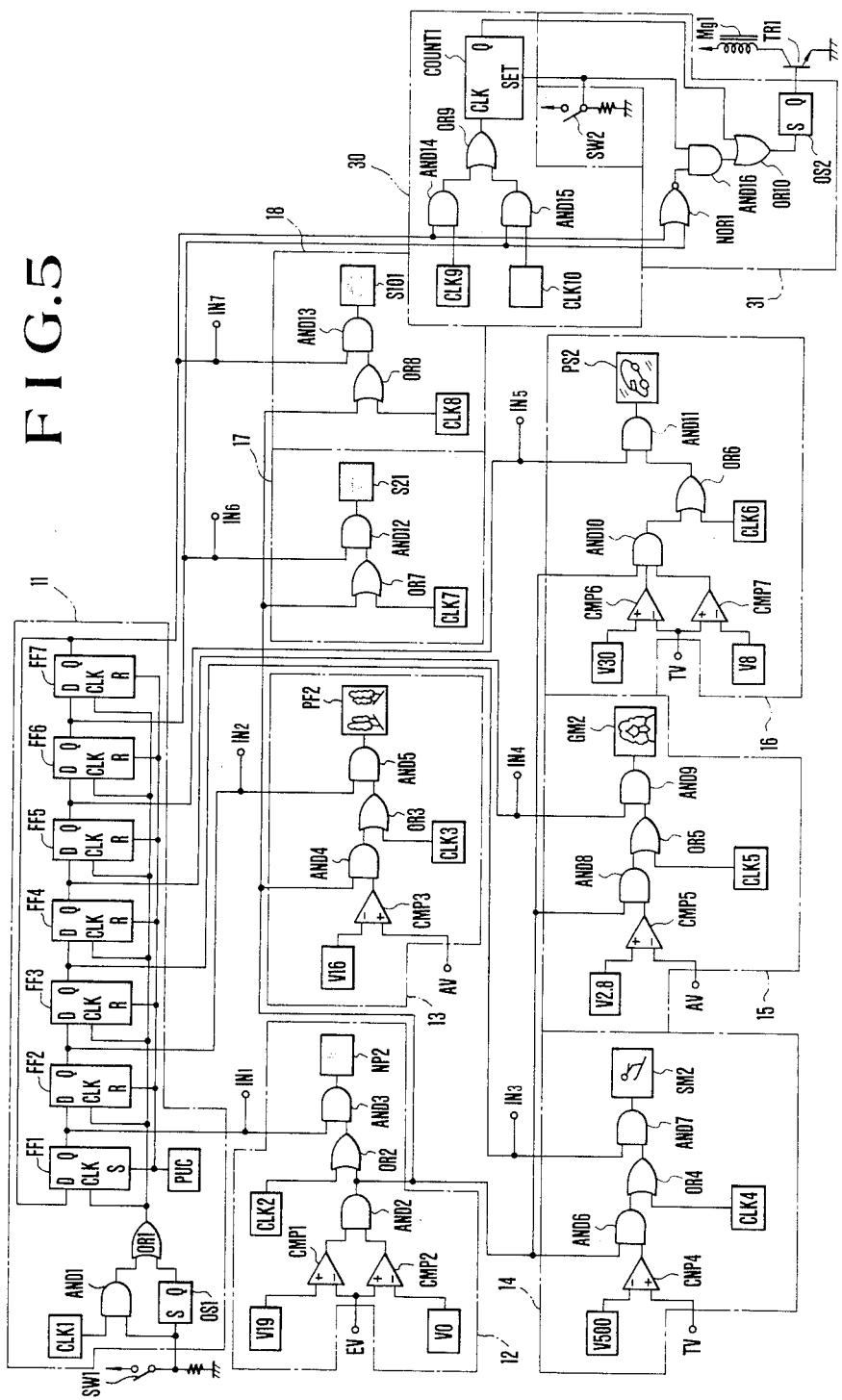
FIG. 5 is a circuit diagram showing the details of a switching circuit, a display driving circuit and a release circuit which are shown in FIG. 4.
Figure 6:
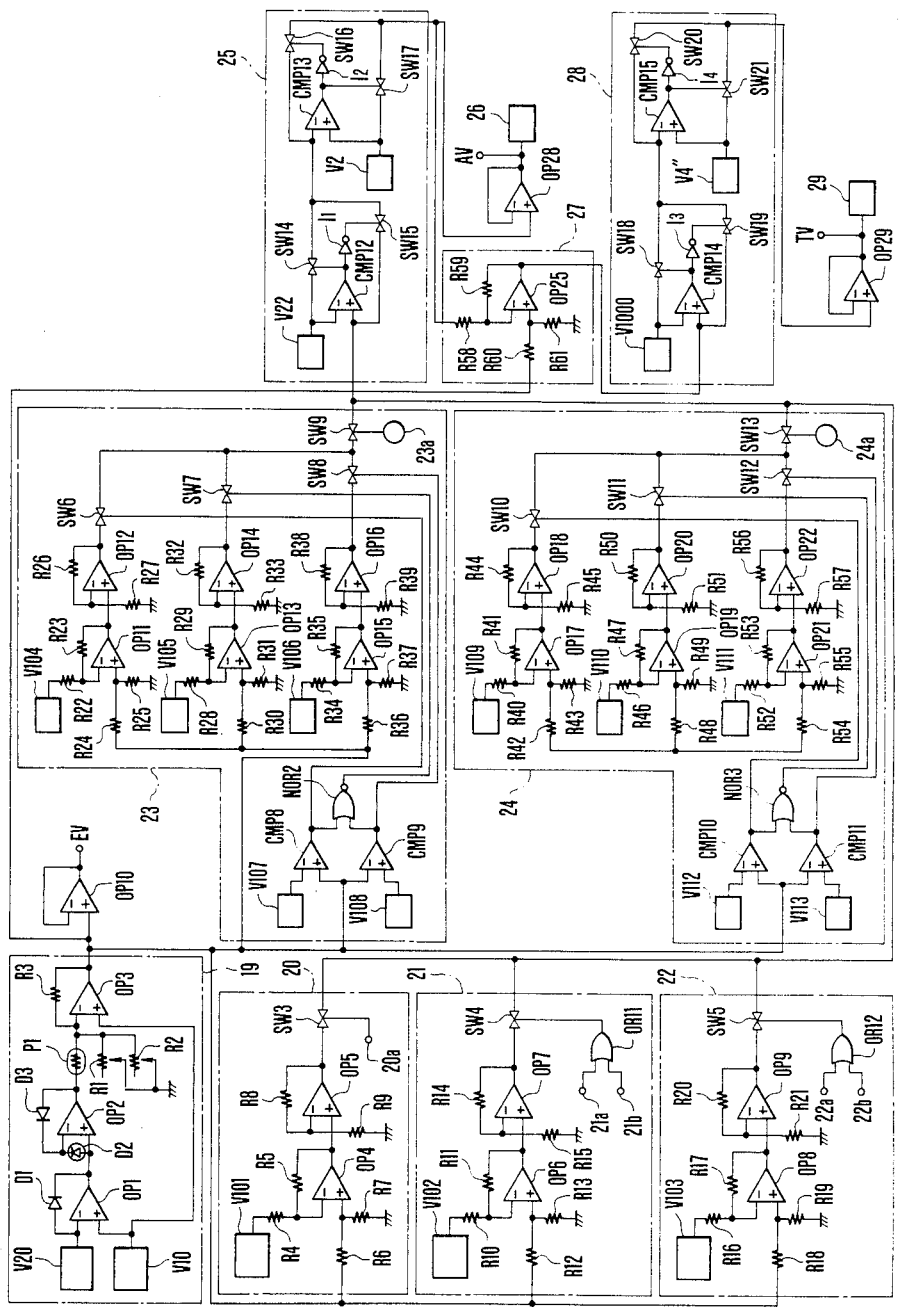
FIG. 6 is a circuit diagram showing the details of a selection circuit and a limiter circuit shown in FIG. 4.

FIGS. 5 and 6 more concretely show the circuit arrangement of FIG. 4. In the selection signal generating circuit 11 of FIG. 5, a pulse oscillator CLK1 produces a pulse signal which alternately becomes a high level and a low level at a predetermined period. A one-shot multivibrator OS1 which produces a high level signal of one pulse every time a high level rise signal is impressed on the input terminal S thereof in response to the operation of the switch SW1. The circuit 11 includes an AND gate AND1; an OR gate OR1; a D type flip-flop circuits FF1–FF7; and a power-up clear circuit PUC which produces one pulse when a power supply closing switch (not shown) turns on. The output of the power-up clear circuit PUC is arranged to be impressed on the set input terminal S of the flip-flop FF1 and on the reset input terminal R of the other flip-flop circuits FF2–FF7.

In the normal program display driving circuit 12, a display circuit NP2 is arranged to cause the pictograph display 4c to light up. The circuit 12 includes AND gates AND2 and AND3; an OR gate OR2; and comparators CMP1 and CMP2. A voltage corresponding to an exposure value EV is arranged to be impressed on the inversion input terminal of the comparator CMP1 and the non-inversion input terminal of the comparator CMP2. The non-inversion input terminal of the comparator CMP1 is arranged to have a voltage produced from a constant voltage source V19 impressed thereon. The inversion input terminal of the comparator CMP2 is arranged to have a voltage produced from another constant voltage source V0 impressed thereon. The constant voltage source V19 is arranged to produce a voltage corresponding to an exposure value EV19 while the other constant voltage source produces a voltage corresponding to an exposure value EV0. An oscillator CLK2 produces a pulse signal which alternately repeats a high level and a low level at a predetermined period. The output of the oscillator CLK2 is supplied to one of the input terminals of the OR gate OR2.

In the pan focus program display driving circuit 13, a display circuit PF2 is arranged to cause the pictograph display 4e2 of FIG. 3 to light up. The circuit 13 includes AND gates AND4 and AND5; an OR gate OR3; and a comparator CMP3. The non-inversion input terminal of this comparator CMP3 is arranged to have a voltage corresponding to an aperture value AV impressed thereon. A constant voltage source V16 produces a voltage corresponding to an aperture value of F 16. The output of the constant voltage source V16 is supplied to the inversion input terminal of the comparator CMP3. An oscillator CLK3 produces a pulse signal the level of which alternately becomes high and low at a predetermined period. The output of the oscillator CLK3 is supplied to one of the input terminals of the OR gate OR3.

In the stop motion mode program display driving circuit 14, a display circuit SM2 is arranged to cause the pictograph display 4d2 of FIG. 3 to light up. The driving circuit 14 includes AND gates AND6 and AND7; an OR gate OR4; and a comparator CMP4. The non-inversion input terminal of the comparator CMP4 is arranged to have a voltage corresponding to a shutter speed or time value TV impressed thereon. A constant voltage circuit V500 is arranged to produce a voltage corresponding to a shutter speed of 1/500. The voltage thus produced is impressed on the inversion input terminal of the comparator CMP4. An oscillator CLK4 is arranged to produce a pulse signal the level of which alternately becomes high and low at a predetermined period. The output of the oscillator CLK4 is supplied to one of the input terminals of the OR gate OR4.

In the gradate mode program display driving circuit 15, a display circuit GM2 is arranged to cause the pictograph display 4d1 of FIG. 3 to light up. The circuit 15 includes AND gates AND8 and AND9; an OR gate OR5; a comparator CMP5 which has a voltage corresponding to an aperture value AV impressed on its inversion input terminal; a constant voltage circuit V2.8 which produces a voltage corresponding to an aperture value of F 2.8 and supplies the voltage to the non-inversion input terminal of the comparator CMP5; and an oscillator CLK5 which produces a pulse signal. The level of the pulse signal alternately becomes high and low at a predetermined period. This output of the oscillator CLK5 is supplied to one of the input terminals of the OR gate OR5.

In the panning shot mode program display driving circuit 16, a display circuit PS2 is arranged to cause the pictograph display 4e1 of FIG. 3 to light up. The circuit 16 includes AND gates AND10 and AND11; an OR gate OR6; and comparators CMP6 and CMP7. The inversion input terminal of the comparator CMP6 and the non-inversion input terminal of the other comparator CMP7 are arranged to have a voltage corresponding to a shutter speed value TV impressed thereon. The circuit 16 further includes a constant voltage circuit 1/30 which produces a voltage corresponding to a shutter speed value of 1/30 and supplies this voltage to the noninversion input terminal of the comparator CMP6;

another constant voltage circuit ⅛ which produces a voltage corresponding to a shutter speed value of ⅛ and supplies it to the inversion input terminal of the comparator CMP7; and an oscillator CLK6 arranged to produce a pulse signal which alternately becomes a high level and a low level and is supplied to one of the input terminals of the OR gate OR6.

In the 2 sec self-timer mode program display driving circuit 17, a display circuit S21 is arranged to cause the pictograph display 4b of FIG. 3 to light up. The circuit 17 includes an AND gate AND12; an OR gate OR7; and an oscillator CLK7 arranged to produce a pulse signal. The pulse signal alternately becomes a high level and a low level at a predetermined period and is supplied to one of the input terminals of the OR gate OR7.

In the 10 sec self-timer mode program display driving circuit 18, a display circuit S101 is arranged to cause the pictograph 4a of FIG. 3 to light up. The circuit 18 includes an AND gate AND13; an OR gate OR8; and an oscillator CLK8. The oscillator CLK8 produces a pulse signal which alternately becomes a high level and a low level at a predetermined period and is supplied to one of the input terminals of the OR gate OR8.

In the timer circuit 30 and the release driving circuit 31, there are provided AND gates AND14, AND15 and AND16; OR gates OR9 and OR10; a NOR gate NOR1; a release switch SW2; and an oscillator CLK9 which is arranged to produce an output of a square wave at a frequency of 1 KHz (at a period of 1 msec). The output of the oscillator CLK9 is supplied to one of the input terminals of the AND gate AND14. There is provided another oscillator CLK10 which produces an output of square wave at a frequency of 5 KHz (period: 0.2 msec). The output of the oscillator CLK10 is supplied to one of the input terminals of the AND gate AND15. Further, a counter COUNT1 is arranged to perform a count-up action every time a rise signal which changes from a low level to a high level is supplied to the input terminal CLK thereof. When the counter COUNT1 counts 10,000 times, the output from its output terminal Q shifts from a low level to a high level in a short period of time. A reference symbol OS2 denotes a one-shot multivibrator which produces from its output terminal Q a high level pulse for a short period of time when a rise signal is impressed on its input terminal S. There are further provided a transistor TR1 and an electromagnet Mg1 which has a permanent magnet at the core and a coil wound around the outside thereof. When not energized, the electromagnet Mg1 attracts a shutter locking member (not shown) by the holding force of the permanent magnet. However, when the coil is energized with the transistor TR1 turned on, a current flows in the direction of cancelling the magnetic flux of the permanent magnet to release the locking member from the attracked state. Then, a series of release processes begins.

The circuit arrangement which is described above operates as follows: When a power supply switch (not shown) is turned on to effect power supply, the power-up clear circuit PUC produces a high level signal for a short while to set the flip-flop FF1 and to reset other flip-flops FF2–FF7. This causes a high level signal to be produced from the output terminal Q of the flip-flop FF1 while low level outputs are produced from the output terminals Q of other flip-flops FF2–FF7. After that, this condition lasts until the switch SW1 is turned on with the mode selection button 5 pushed.

When the switch SW1 is momentarily turned on, a rise signal is impressed on the input terminal S of the one-shot multivibrator OS1. The one-shot multivibrator OS1 produces a high level signal for a short period of time. This output is supplied via the OR gate OR1 to the input terminals CLK of the flip-flop circuits FF1–FF7. As a result, the output level of the output terminal Q of the flip-flop FF2 which has a high level input impressed on its input terminal D changes from a low level to a high level. Meanwhile, low level outputs are produced from the output terminals Q of other flip-flops FF1, FF3–FF7 which have low level inputs impressed on their input terminals D respectively.

Following this, when the switch SW1 is again momentarily turned on, the output level of the output terminal Q of the flip-flop FF3 which has a high level input impressed on its input terminal D changes from a low level to a high level. Meanwhile, low level outputs are produced from the output terminals Q of other flip-flops FF1, FF2, FF4–FF7 which have low level inputs impressed on their input terminals D. In other words, the flip-flop circuit that produces a high level output shifts in the order of FF1→FF2→FF3 and so on every time the switch SW1 is shifted from an off position to an on position. Further, if the switch SW1 is shifted from the off position to the on position and is then kept in the on position, a high level signal is continuously impressed on one of the input terminals of the AND gate AND1. As a result of this, the signal from the oscillator CLK1 which alternately repeats a high level and a low level comes to be produced as it is from the output terminal of the AND gate AND1. The output of the AND gate AND1 is arranged to be supplied via the OR gate OR1 to the input terminals CLK of the flip-flops FF1–FF7. Therefore, with the switch SW1 kept closed the flip-flop that produces a high level output still shifts in the order of FF1→FF2→FF3→FF4→FF5→FF6→FF7→FF1→. . . at the same period as that of the oscillator CLK1.

Now, coming back to the begining of operation, when the pulse output is produced from the power-up clear circuit PUC with the power supply switch closed, the output level of the output terminal Q of the flip-flop FF1 alone becomes high. At this instant, the normal program line selection circuit 20 on which the output IN1 of the flip-flop FF1 is impressed is selected. Then, the aperture value AV and the shutter time value TV are computed along the program line C of FIG. 2. However, in this instance, if the voltage representing the value EV and being produced from the light measuring circuit which will be described later (hereinafter this voltage will be called the voltage VEV) is VEV<V19, that is, if the light quantity of the object to be photographed is less than the value EV19, the output level of the comparator CMP1 becomes high.

Further, in the event of VEV>V0, that is, if the light quantity of the object is larger than the value EV0, the output level of the other comparator CMP2 becomes high. The outputs of the two comparators CMP1 and CMP2 are arranged to obtain a logical product of them by means of the AND gate AND2. Therefore, the output level of the AND gate AND2 becomes high only when the value VEV is in a state of V19>VEV>V0. Conversely, in case of VEV>V19, the output level of the comparator CMP1 becomes low and, if the voltage VEV is VEV<V0, the output level of the comparator CMP2 becomes low. Therefore, in the event of VEV>V19 or VEV<V0, the output level of the AND gate AND2 becomes low. As apparent from the above description, in the case of the brightness of the object which permits adequate exposure control within the range of exposure values from EV0 to EV19, the output level of the AND gate AND2 becomes high. However, if the brightness is brighter than EV19 (the object is too bright) or darker than EV0 (too dark), the output level of the AND gate AND2 becomes low.

In cases where the voltage VEV is in a state of V19>VEV>V0, the circuit of the embodiment operates as follows: In this instance, the output level of the AND gate AND2 becomes high. Since the output of the AND gate AND2 is supplied to one of the input terminals of the OR gate OR2, the output of the OR gate OR2 also becomes high. The output of the OR gate OR2 is supplied to one of the input terminals of the AND gate AND3. Meanwhile, a high level signal from the output terminal Q of the flip-flop FF1 is impressed on the other input terminal of the AND gate AND3. Therefore, the output level of the AND gate AND3 becomes high. This causes the display circuit NP2 to operate to light up the pictograph display 4c of FIG. 3. This display informs the photographer that the program mode selected is the normal program.

If the voltage VEV is in a state of deviating from the relation of V19>VEV>V0, a low level input is impressed one of the input terminals of the OR gate OR2 with the output level of the AND gate AND2 becoming low. However, since a signal which is repeating a high level and a low level is impressed from the oscillator CLK2 on the other input terminal of the OR gate OR2, the output of the OR gate OR2 comes to have the same wave form as that of the output of the oscillator CLK2. This output of the OR gate OR2 is supplied to the AND gate AND3. The output of the AND gate AND3 thus comes to have the same wave form as that of the oscillator CLK2. As a result, the display circuit NP2 repeatedly and alternately becomes operative and inoperative at the same period as the oscillator CLK2. This causes the pictograph display 4c of FIG. 3 to flicker to inform the photographer that, although the normal program mode is now selected, no apposite exposure can be obtained because of inapposite light quantity.

Next, when the flip-flop producing a high level output is shifted from the flip-flop FF1 to the next flip-flop FF2 by again shifting the switch SW1 from its off position to its on position as mentioned in the foregoing, the selection circuit 21 which has the signal IN2 impressed thereon from the output terminal Q of the flip-flop FF2 and is arranged to select the pan focus program line is selected. In this instance, the aperture value AV and the shutter time value TV are computed on the program line E. Then, if the computed aperture value AV (hereinafter will be called VAV) produced from the light measuring circuit which will be described later with reference to FIG. 6 is VAV>V16, that is, if the computed aperture value AV is larger than an aperture value F 16, the output level of the comparator CMP3 becomes high.

If, conversely, the computed aperture value AV is smaller than F 16, the output level of the comparator CMP3 becomes low. Since the output of the above-stated AND gate AND2 and that of the comparator CMP3 are supplied to the input terminals of the AND gate AND4, the AND gate AND4 produces a high level output only when the exposure value EV is within a range of 0-19 and the computed aperture value AV is larger than the aperture value of F 16. In cases where the exposure value EV and the computed aperture value AV are satisfying the above-stated condition, the operation of the circuit arrangement is as follows: The AND gate AND4 produces a high level output. Therefore, the output level of the OR gate OR3 also becomes high. High level signals are thus impressed on both input terminals of the AND gate AND5. The AND gate AND5 produces a high level output to render thereby the display circuit PF2 operative. The pictograph display 4e2 of FIG. 3 then lights up to inform the photographer of selection of the pan focus program mode.

If the exposure value EV and the computed aperture value AV deviate from the above-stated condition, the AND gate AND4 produces a low level output. As a result, a low level input is impressed on one of the input terminals of the OR gate OR3. Meanwhile, a signal repeating a high level and a low level which is produced from the oscillator CLK3 is impressed on the other input terminal of the OR gate OR3. This causes the wave form of the output of the OR gate OR3 to become the same as that of the output of the oscillator CLK3. Since the output of the OR gate OR3 is supplied to the AND gate AND5, the wave form of the output of the AND gate AND5 also becomes the same as the output of the oscillator CLK3. Therefore, the display circuit PF2 alternately and repeatedly becomes operative and inoperative to cause thereby the pictograph display 4e2 of FIG. 3 to flicker. The flickering display informs the photographer that, although the pan focus mode is presently selected, no apposite exposure can be obtained because the brightness of the object to be photographed is such that the pan focus effect is hardly obtainable therefrom.

Let us now assume that the switch SW1 is further turned on from its off position to cause thereby the flip-flop FF3 to produce a high level output. The operation of the circuit arrangement in this instance is as follows: The operation is similar to the foregoing description of the cases wherein other flip-flop circuits FF1 and FF2 are producing high level outputs and, therefore, does not require detailed description. With the high level output produced from the flip-flop FF3, the selection circuit 22 provided for the stop motion program line is selected. Then, an aperture value AV and a shutter time value TV are computed on the program line D of FIG. 2. In this instance, if the brightness of the object is such that the exposure value EV is within a range of 0-19 and the computed shutter time value TV becomes larger than a shutter speed value of 1/500, the display circuit SM2 becomes operative to cause the pictograph display 4d2 of FIG. 3 to light up.

If the exposure value EV and the computed shutter time value TV deviate from the above-stated condition, the displa circuit SM2 alternately repeats its operation and non-operation at the same period of frequency as the oscillator CLK4 to cause thereby the pictograph display 4d2 to flicker. This informs the photographer that the stop motion effect is not obtainable.

Another flip-flop FF4 comes to produce a high level output when the switch SW1 is once again turned on. Then, the selection circuit which is arranged for the gradate mode program line is selected. An aperture value AV and a shutter time value are computed on the program line D of FIG. 2. If the brightness of the object in this instance is such that the exposure value EV is within a range 0-19 and the computed aperture value AV is smaller than an aperture of F 2.8, the display circuit GM2 becomes operative to cause the pictograph 4d1 of FIG. 3 to light up.

If the exposure value EV and the computed aperture value AV deviate from the above-stated condition, the display circuit GM2 alternately and repeatedly becomes operative and inoperative at the same period as the oscillator CLK5 to cause thereby the pictograph display 4d1 of FIG. 3 to flicker. The flickering display warns the photographer that the gradate effect cannot be obtained.

When the switch SW1 is again turned on, the flip-flop FF5 produces a high level output. This time, the selection circuit 21 which is provided for the panning shot program line is selected. An aperture value AV and a shutter time value TV are computed on the program line E of FIG. 2. Then, if the brightness of the object is such that the exposure value EV is within a range 0–19 and the computed shutter time value TV is larger than a shutter speed value of ⅛ and smaller than 1/30, the display circuit PS2 becomes operative to cause the pictograph display 4e1 to light up. In the event of deviation of the exposure value EV and the shutter time value TV from the above-stated condition, the display circuit PS2 alternately and repeatedly becomes operative and inoperative at the same period as the oscillator CLK6. Then, the pictograph display 4e1 of FIG. 3 flickers to warn the photographer that the panning effect is not obtainable.

With the exception of the self-timer modes, the selection of other modes, displays under normal conditions and warning displays under abnormal conditions have been described in the foregoing. Next, the operation of the embodiment in the self-timer modes is as follows:

After the above-stated panning shot mode is selected, if the switch SW1 is further turned on from its off position, the output level of the output terminal Q of the flip-flop FF6 becomes high. The 2 sec self-timer mode program line selection circuit 23 which is arranged to receive the signal IN6 from the output terminal Q of the flip-flop FF6 comes to operate. Then, an aperture value AV and a shutter time value TV are computed on the program line B of FIG. 2. If, in this instance, the object brightness is such that the exposure value EV is within a range from 0 to 19, the AND gate AND2 produces a high level output to supply it to one of the input terminals of the OR gate OR7. The OR gate OR7 thus produces a high level output. Therefore, high level inputs are impressed on both input terminals of the AND gate AND12. The AND gate AND12 produces a high level output to render the display circuit S21 operative. This causes the pictograph display 4b of FIG. 3 to light up. In the event of the brightness of the object outside of the range of exposure values EV0–EV19, a low level input is impressed on one of the input terminals of the OR gate OR7. The wave form of the output of the OR gate OR7 then becomes the same as that of the output of the oscillator CLK7. The wave form of the output of the AND gate AND12 also becomes the same as that of the oscillator CLK7. Therefore, the display circuit S21 repeatedly and alternately becomes operative and inoperative at the same period of frequency as the oscillator CLK7. As a result, the pictograph display 4b of FIG. 3 flickers to inform the photographer that no apposite exposure can be obtained.

When the switch SW1 is once again turned on from its off position, the output terminal Q of the flip-flop FF7 comes to produce a high level output. Then, the selection circuit 24 for the 10 sec self-timer mode program line becomes operative. An aperture value AV and a shutter time value TV are computed on the program line A of FIG. 2. Then, in the same manner as in the case of the 2 sec self-timer mode, if the brightness of the object is within the range of exposure values EV0–EV19, the display circuit S101 becomes operative to cause the pictograph display 4a of FIG. 3 to light up. In the event of object brightness outside of the above-stated range, the display circuit S101 repeatedly becomes operative and inoperative at the same timing as the period of the oscillator CLK8. The pictograph display 4a of FIG. 3 then flickers to give a warning to the photographer.

Next, when the release switch SW2 is turned on after selection of one of the program modes, the embodiment operates as follows:

In case that a photographing mode other than the 2 sec and 10 sec self-timer modes is selected, low level inputs are impressed on both the input terminals of the NOR gate NOR1. The NOR gate NOR1 thus comes to produce a high level output. With the release switch SW2 turned on via the release button 3 under this condition, high level signals are impressed on the two input terminals of the AND gate AND16. The AND gate AND16 produces a high level output. As a result, the output level of the OR gate OR10 also becomes high. With the output level of the OR gate OR10 changing from a low level to a high level then, the rising edge of the output renders the one-shot multivibrator OS2 operative to cause it to produce a high level signal for a short period of time. The high level signal renders the transistor TR1 operative. The electromagnet Mg1 is energized. A release member (not shown) is released from a locked state to allow a series of release processes to be carried out.

In case that the release switch SW2 is turned on after selection of the 2 sec or 10 sec self-timer mode, the embodiment operates as follows:

With either the 2 sec self-timer mode or the 10 sec self-timer mode selected, the flip-flop FF6 or FF7 produces a high level output. The output level of the NOR gate NOR1 becomes low. This results in the low level output of the AND gate AND16. When the release switch SW2 is turned on under this condition, a rising signal is impressed on the input terminal SET of the counter COUNT1. The contents of the counter is cleared. The counter COUNT1 begins to count. In the case of the 2 sec self-timer mode, the AND gate AND15 opens. Then, the output of the oscillator CLK10 which produces a square wave at an oscillation frequency of 5 KHz is supplied via the OR gate OR9 to the input terminal CLK of the counter COUNT1. The counter counts the rising edges of 10,000 pulses. Upon completion of the count, the counter produces a high level signal for a short while from the output terminal Q thereof. The counting period of time is $10,000 \times 1/5 \times 10^3 = 2$ seconds.

In the event of selection of the 10 sec self-timer mode, the AND gate AND14 opens. The output of the oscillator CLK9 which is arranged to produce a square wave at an oscillating frequency of 1 KHz is allowed to be supplied via the OR gate OR9 to the input terminal CLK of the counter COUNT1. In this case, the counter also counts 10,000 and produces a high level output after the count. However, in this case, the counting time is $10,000 \times 1/10^3 = 10$ seconds.

In both cases of the 2 sec self-timer mode and the 10 sec self-timer mode, the rising edge of the output from the output terminal Q of the counter COUNT1 is impressed on the input terminal S of the one-shot multivibrator OS2 via the OR gate OR2. The one-shot multivibrator OS2, therefore, operates to turn on the transistor TR1 in the same manner as in the cases of the modes other than the self-timer modes. Therefore, the electromagnet Mg1 receives power supply and allows the ensuing series of release processes to be carried out.

Referring to FIG. 6, the light measuring circuit 19 includes a constant voltage source V10 which is arranged to give a bias voltage to the non-inversion input terminals of operational amplifiers (hereinafter will be called operational amplifier) OP1 and OP3, which will be described later. The light measuring circuit 19 further includes a constant current source V20; operational amplifiers OP1, OP2 and OP3; a temperature compensating diode D1; a photo diode D2 which produces a photo current proportional to the object brightness; a diode D3 for logarithmic compression; a posistor P1; an Sv information resistor R1 arranged to give information on film sensitivity; an Avo information resistor R2 arranged to give information on the maximum open F-number of a lens 2 mounted on the camera body; and a resistor R3. With these elements arranged to form a known light measuring circuit, a voltage VEV which corresponds to an exposure value EV is obtained. In the normal program line selection circuit 20, the output from the output terminal Q of the flip-flop FF1 is arranged to be impressed on an input terminal 20a.

The selection circuit 21 for the pan focus program and the panning shot program is arranted to have the outputs of the output terminals Q of the flip-flop circuits FF2 and FF5 impressed respectively on input terminals 21a and 21b as the same program line is used for both the pan focus mode and the panning shot mode.

In the selection circuit 22 for the stop motion program and the gradate mode program, the outputs from the output terminals Q of the flip-flop circuits FF3 and FF4 are arranged to be impressed on the input terminals 22a and 22b of the circuit 22 respectively as the same program line is used for both the stop motion mode and the gradate mode. The selection circuit 23 which is provided for selection of the 2 sec self-timer mode program is arranged to have the output from the output terminal Q of the flip-flop FF6 impressed on its input terminal 23a.

The selection circuit 24 which is provided for selection of the 10 sec self-timer mode program is arranged to have the output from the output terminal Q of the flip-flop FF7 impressed on its input terminal 24a.

In these selection circuits 20–24, the circuit arrangement includes constant voltage sources V101–V113; operational amplifiers OP4–OP22; resistors R4–T57; analog switches SW3–SW11 each of which is arranged to be rendered conductive by impression of a high level control signal and non-conductive by that of a low level control signal; OR gates OR11 and OR12; NOR gates NOR2 and NOR3; and comparators CMP8–CMP11. Each of these selection circuits 20–24 computes an aperture value AV in response to the voltage VEV which corresponds to an exposure value and is produced from the circuit 19. Each of these circuit 20–24 then produces a voltage corresponding to the computed aperture value AV.

The limiter circuit 25 includes a constant voltage source V22 which produces a voltage corresponding to an aperture value of F 22; and another constant voltage source V2 which produces a voltage corresponding to an aperture value of F 2. There are provided comparators CMP12 and CMP13; analog switches SW14–SW17; and inverters I1 and I2. The limiter circuit 25 serves to limit the voltage produced from each of the selection circuits 20–24 and is arranged to produce an output in such a manner that the voltage VAV is within a range of aperture values not exceeding F 22 and not below F 2.

The subtraction circuit 27 comprises an operational amplifier OP25 and resistors R58–R61. The subtraction circuit 27 subtracts the output VAV produced from the limiter circuit 25 from the output VEV produced from the light measuring circuit 19 to produce therefrom an output which can be expressed as VTV=VEV−VAV.

Another limiter circuit 28 comprises a constant voltage source V1000 which produces a voltage corresponding to a shutter time value TV of 1/1000; another constant voltage source V4″ which produces a voltage corresponding to a shutter time value TV of 4 sec; comparators CMP14 and CMP15; analog switches SW18–SW21; and inverters I3 and I4. The limiter circuit 28 operates to limit the voltage VTV produced from the subtraction circuit 27 and to have the value of the voltage VTV within a range of shutter time values not exceeding 1/1000 sec and not below 4 sec. The circuit 28 further includes operational amplifiers OP10, OP28 and OP29 which serve as buffers. The operational amplifier OP10 is arranged to supply a voltage VEV to the selection circuit 12. The operational amplifier OP28 supplies a voltage VEV to the selection circuits 13 and 15. Another operational amplifier OP29 supplies a voltage VTV to the selection circuits 14 and 16. The circuit arrangement described operates as follows:

The light measuring circuit 19 requires no detailed description as it is arranged in a known manner. First, a photo current corresponding to the brightness of an object to be photographed flows through the photo diode D2. The photo current is logarithmically compressed by the operational amplifier OP2 and the logarithmic compressing diode D3. Meanwhile, the temperature compensating circuit which is composed of the constant current circuit V10, the diode D1 and the operational amplifier OP1 produces an output. The output of the temperature compensating circuit is impressed on the non-inversion input terminal of the operational amplifier OP2 to offset the saturation currents of the diodes D2 and D3 which are of the same characteristic and are flowing in the opposite direction. The output of the operational amplifier OP2 thus logarithmically compresses the object brightness and thus becomes a voltage proportional to the absolute temperature. This voltage is computed through the posistor P1, the resistor R3 and the operational amplifier OP3. The output of the operational amplifier OP3 thus becomes a logarithmically compressed value which is independent of the temperature of the brightness of the object to be photographed.

Then, information on the film sensitivity and information on the full open aperture F-number of the lens in use are added by the Sv information resistor R1 and the Avo information resistor R12 to the output of the operational amplifier OP3 to make it into a voltage corresponding to an exposure value EV. The value (VEV) of this voltage is supplied to each of the program selection circuits.

When the normal program mode is selected by the photographer, the output from the output terminal Q of the flip-flop FF1 of the circuit 11 shown in FIG. 5 is at a high level as mentioned in the foregoing. This high level output is transmitted via the terminal 20a to the analog switch SW3 and the output of the normal program line selection circuit 20 is selectively produced. In the normal program line selection circuit 20, the resistors R4, R5, R6 and R7 and the operational amplifier OP4 constitute a known subtraction circuit. These resistors R4, R5, R6 and R7 are arranged to be of the same value. Assuming that the voltage produced from the constant voltage source V101 is V101, the operational amplifier OP4 produces a voltage VEV-V101 on the basis of the output VEV of the light measuring circuit 19. The output voltage VEV-V101 is supplied to a known positive-phase amplification circuit formed by resistors R8 and R9 and the operational amplifier OP5. The operational amplifier OP5 then produces a voltage which can be expressed as follows:

$$\left(1 + \frac{R8}{R9}\right)(VEV - V101)$$

This formula is rearranged as shown below:

$$\left(1 + \frac{R8}{R9}\right) = A \left(1 + \frac{R8}{R9}\right) V101 = B$$

Then, the output voltage of the operational amplifier OP5 can be formularized as follows:

A VEV−B

The output A VEV−B of the operational amplifier OP5 is a linear expression for the VEV. In this formula, A is arranged to be ½ and B to be ½ by the setting values of the output voltages of the resistors R1 and R2 and the constant voltage source V101. Therefore, the output of the circuit 20 can be expressed as VAV=½VEV−½. Thus, an aperture value AV shown on the line C of FIG. 2 is produced as the output VAV of the circuit 20. The output of the circuit 20 is supplied to the limiter circuit 25. The limiter circuit 25 compares the computed aperture value AV recieved at the comparator CMP12 with a voltage corresponding to an aperture value of F 22. If the voltage corresponding to the computed aperture value AV is lower than the voltage corresponding to the aperture value of F 22, the comparator CMP12 produces a low level output which is impressed on the analog switch SW14. Meanwhile, the switch SW15 receives a high level input via the inverter I1. As a result, the switch SW14 becomes non-conductive and the switch SW15 conductive. The voltage which corresponds to the computed aperture value AV is thus supplied as it is to the inversion input terminal of the comparator CMP13.

In case that the computed aperture value AV exceeds the aperture value of F 22, the output of the comparator CMP12 renders the switch SW14 conductive and the other switch SW15 non-conductive. The voltage corresponding to the aperture value of F 22 then comes to the inversion input terminal of the comparator CMP13. At the comparator CMP13, if a voltage supplied to the inversion input terminal of this comparator is higher than the voltage corresponding to an aperture value F 2, a low level output is produced. This low level output is impressed on the analog switch SW17 to render it non-conductive. Meanwhile, this renders another switch SW16 conductive. Thus, when the voltage impressed on the inversion input terminal of the comparator CMP13 is higher than a voltage corresponding to the aperture value of F 2, the impressed voltage is produced as it is. If the voltage supplied to the inversion input terminal of the comparator CMP13 is lower than the voltage corresponding to the aperture value of F 2, the comparator CMP13 produces a high level output. The high level output renders the switch SW16 non-conductive and another switch SW17 conductive to produce a voltage corresponding to the aperture value of F 2. With the limiter circuit 25 being arranged in this manner, the voltage corresponding to a computed aperture value AV is subjected to a limitation process which is carried out in such a manner as to have it within a range not exceeding an aperture value of F 22 and not below another aperture value of F 2. Therefore, when the output of the normal program line selection circuit 20 is of a value within the range of aperture values from F 22 to F 2 as shown by the program line C of FIG. 2, the output is allowed to be produced as it is through the limiter circuit 25. The output is then transmitted via the buffer OP28 to the aperture control circuit 26 to have the aperture of the lens adjusted accordingly. In case that the output of the selection circuit 20 either exceeds F 22 or is below F 2, the limiter circuit 25 comes to produce a voltage corresponding either to F 22 or to F 2. Then, the aperture is adjusted according to this voltage which corresponds either to F 22 or F 2. With the normal program selected, therefore, the aperture is adjusted according to the line C of FIG. 2.

Further, the output of the limiter circuit 25 is supplied to the subtraction circuit 27. The subtraction circuit 27 comprises resistors R58-R61 and an operational amplifier OP25 and is arranged in a known manner. At the circuit 27, the output VEV of the light measuirng circuit 19 and the aperture value VAV obtained via the limiter circuit 25 are subjected to computation VEV−-VAV.

The result VEV−VAV of this computation is supplied to a limiter circuit 28. The result VEV−VAV is a voltage VTV representing a shutter time value TV. The limiter circuit 28 operates basically in the same manner as the other limiter circuit 25. The outline of the operation of the limiter circuit 28 is as follows: A constant voltage source $V_a1000$ is arranged to produce a voltage V1000 corresponding to a shutter speed or time value of 1/1000 sec. Another constant voltage source V4″ is arranged to produce a voltage V4″ corresponding to a shutter speed value of 4 secs. When the voltage VEV−VAV received from the subtraction circuit 27 is larger than the voltage V1000, the output level of the comparator CMP14 becomes high. Then, the voltage V1000 is supplied to the non-inversion input terminal of another comparator CMP15. If the voltage VEV−-VAV is smaller than the voltage V4″, the output level of the comparator CMP15 becomes high and the voltage V4″ is produced. Such being the arrangement of the limiter circuit 28, the input VEV−VAV is subjected to a limitation process which is carried out to have it within a range of shutter speed values not higher than 1/1000 sec and not lower than 4 secs. Accordingly, when the output VEV−VAV of the subtraction circuit 27 is a voltage VTV corresponding to a shutter time value within the range between 4 sec and 1/1000 sec, the limiter circuit 28 transmits this voltage via the operational amplifier OP29 to the shutter control circuit 29.

Then, the shutter time is controlled on the basis of this voltage VTV. If the output VEV−VAV is a voltage corresponding to a shutter time which is either longer than 4 sec or shorter than 1/1000 sec, the limiter circuit 28 produces a voltage VTV which either corresponds to 4 sec or corresponds to 1/1000 sec and then the shutter time is controlled and adjusted either to 4 sec or 1/1000 sec accordingly. Thus, the shutter time and aperture values are adjusted according to the program line C shown in FIG. 2.

In the event of selection of the pan focus mode or the panning shot program, the embodiment operates as follows: In this case, the flip-flop FF2 or FF5 of the circuit 11 shown in FIG. 5 produces a high level output from its output terminal Q. Therefore, a high level input is impressed via the OR gate OR11 on the analog switch SW4. The output of the selection circuit 21 is then selectively transmitted to the above-stated limiter circuit 25. The circuit 21 is arranged basically in the same manner as the above-stated circuit 20. The circuit 21 thus produces an output which can be expressed by the above-stated formula: A VEV−B. In this circuit 21, however, a voltage V102 which is produced from a constant voltage source V102 and the values of resistors R14 and R15 are arranged to have A set at 1 and B at 4. The output VAV of the circuit 21 thus becomes VAV=VEV−4. With the circuit 21 arranged in this manner, a voltage VAV which represents an aperture value AV determined along the program line E of FIG. 2 is produced. The output VAV of the circuit 21 is supplied to the limiter circuit 25 as mentioned above. If the aperture value represented by the output VAV of the circuit 21 is between the aperture values F 22 and F 2, the limiter circuit 25 allows it to be supplied as it is to the aperture control circuit 26. The aperture is then adjusted to the computed aperture value obtained from the circuit 21. In case that the computed aperture value from the circuit 21 either exceeds F 22 or is below F 2, the aperture is forcedly adjusted to F 22 or F 2, so that the aperture can be adjusted according to the program line E of FIG. 2. Meanwhile, the shutter time is also controlled in the same manner as in the case of the normal program.

When the stop motion program or the gradate mode program is selected, the operation of the embodiment is as follows: In this case, the Q output terminal of the flip-flop FF3 or FF4 of the circuit 11 of FIG. 5 produces a high level output. Therefore, a high level signal is supplied via the OR gate OR12 to the analog switch SW5. The output of the selection circuit 22 is thus transmitted to the limiter circuit 25 via the switch SW5. The circuit 22 is arranged to produce an output voltage VAV representing an aperture value AV determined according to the formula A VEV−B in the same manner as the circuit 20. In this case, however, a voltage V103 to be produced from the constant voltage source V103 and the values of resistors R21 and R20 are set in such a manner that the A of the formula becomes 1 while B becomes 10. The circuit 22 thus produces a voltage VAV representing an aperture value shown by the program line D of FIG. 2. With this voltage transmitted to the limiter circuit 25, the aperture and the shutter time are controlled in the same manner as mentioned in the foregoing with the control being performed, this time, in accordance with the program line D shown in FIG. 2.

In the event of selection of the 2 sec self-timer program mode, the embodiment operates as follows: The flip-flop FF6 of the circuit 11 of FIG. 5 produces a high level output. The high level output is supplied to the input terminal 23c of the selection circuit 23. The analog switch SW9 turns on. In this mode, the output of the circuit 23 is selected and is selectively supplied to the limiter circuit 25. In the circuit 23, a constant voltage source V107 is arranged to produce a voltage corresponding to an exposure value EV17. Another constant voltage source V108 is arranged to produce a voltage corresponding to an exposure value EV5. These voltages from the constant voltage sources V107 and V108 are respectively compared with the output VEV of the light measuring circuit 19 at the comparators CMP8 and CMP9. When the output voltage VEV of the light measuring circuit 19 is higher than a voltage value corresponding to the exposure value EV17, the comparator CMP8 produces a high level output while the other comparator CMP9 produces a low level output. In that instance, the NOR gate NOR2 which has the outputs of these comparators CMP8 and CMP9 impressed thereon produces a low level output. Then, the analog switch SW6 becomes conductive while switches SW7 and SW8 become non-conductive. Further, if the voltage produced from the light measuring circuit 19 is lower than a voltage value corresponding to the exposure value EV17 and is higher than a voltage value corresponding to another exposure value EV5, the output levels of both the comparators CMP8 and CMP9 become low and that of the NOR gate NOR2 become high. In that instance, the switch SW7 alone becomes conductive while other switches SW6 and SW8 become non-conductive. In cases where the voltage produced from the light measuring circuit 19 is lower than a voltage value corresponding to the exposure value EV5, the comparator CMP8 produces a low level output and the comparator CMP9 a high level output. The NOR gate NOR2 then produces a low level output. As a result, the switch SW8 alone becomes conductive while other switches SW6 and SW7 become non-conductive. Thus, in the 2 sec self-timer mode, the output of the operational amplifier OP12 is produced as the output of the circuit 23 via the switch SW9 when the output of the light measuring circuit, or the photometric output, is higher than a voltage value corresponding to the exposure value EV17. The output of the operational amplifier OP14 is produced as the output of the circuit 23 when the photometric output corresponds to an exposure value between exposure values EV17 and EV5. The output of another operational amplifier OP16 is produced as the output of the circuit 23 when the photometric output corresponds to an exposure value smaller than the exposure value EV5.

Further, the outputs of these operational amplifiers OP12, OP14 and OP16 are produced in the form which can be expressed by the formula VAV=A VEV−B in the same manner as in the case of the above-stated circuit 20. A voltage V105 which is produced from the constant voltage source V105 and the values of resistors R32 and R33 are set in such a manner that, in the above-stated formula, A becomes 0 and B becomes −7. Meanwhile, another voltage V106 which is produced from the constant voltage source V106 and the values of resistors R38 and R39 are set in such a manner that, in the same formula, A becomes 1 while B becomes −2. Such being the arrangement, in the 2 sec self-timer mode, the circuit 23 produces an aperture value indicating output voltage VAV which can be expressed as VEV−10 when the exposure value is above 17. The output voltage VAV becomes 7 when the exposure value EV is between 17 and 5. The output voltage VAV becomes VEV+2 when the exposure value EV is below 5. The output of the circuit 23 is then supplied to the limiter circuit 25 and the aperture is controlled according to the program line B shown in FIG. 2. Further, the shutter time is likewise controlled according to the line B of FIG. 2.

When the 10 sec self-timer mode is selected, the flip-flop FF7 of the circuit 11 of FIG. 5 produces a high level output. The high level output of the flip-flop FF7 is supplied to the input terminal 24a of the circuit 24. The switch SW13 turns on. The output of the circuit 24 is supplied as an aperture signal to the limiter circuit 25.

In the circuit 24, the constant voltage source V112 is arranged to produce a voltage V112 corresponding to an exposure value EV12 while another constant voltage source V113 is arranged to produce a voltage V113 corresponding to an exposure value EV8. The outputs of these constant voltage sources are compared with the output VEV of the light measuring circuit 19 at comparators CMP10 and CMP11. Then, in the same manner as in the case of the above-stated circuit 23, the switch SW10 turns on and the output of the amplifier OP18 is produced as the output of the circuit 24 when the exposure value EV is above 12. If the exposure EV is between 12 and 8, the switch SW11 turns on to have the output of the amplifier OP20 produced as the output of the circuit 24. Further, when the exposure value EV is below 8, another switch SW12 turns on to have the output of another amplifier OP22 produced as the output of the circuit 24. The output voltages VAV of these amplifiers OP18, OP20 and OP22 can be expressed by the formula A VEV−B in the same manner as in the case of the above-stated circuit 20. In the circuit 24, a voltage V109 to be produced and the values of resistors R44 and R45 are adjusted in such a manner that, in the above-stated formula, A becomes 2/7 while B becomes −25/7. A voltage V110 to be produced and the values of resistors R50 and R51 are adjusted in such a manner that A becomes 1 while B becomes 5. Another voltage V111 to be produced and the values of resistors R56 and R57 are adjusted in such a manner that A becomes 1/7 while B becomes −2. Therefore, in the 10 sec self-timer mode, the output VAV of the circuit 24 becomes VAV=2/7 when the exposure value EV is above 12, VAV=VEV−5 when the exposure value EV is between 12 and 8 and VAV−1/7−VEV+2 when the exposure value EV is below 8. With the output VAV of the circuit 24 supplied to the limiter circuit 25, the aperture is controlled in accordance with the program line A shown in FIG. 2. Meanwhile, the shutter time is likewise controlled according to the line A of FIG. 2.

In this embodiment, as described above, when 2 sec self-timer mode is selected, the program line B of FIG. 2 is automatically selected to have the aperture adjusted to a value of F 11 or thereabout. When the 10 sec self-timer mode is selected, the program line A of FIG. 2 is selected to have the aperture adjusted to a wider opening value determined in consideration of the depth of field. Therefore, exposure control can be accomplished in a manner suited for self-timer photography.

Figure 7:
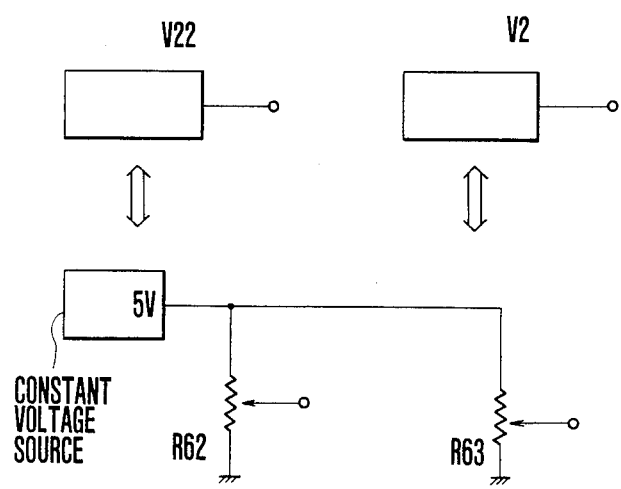
FIG. 7 is a circuit diagram showing by way of example of modification of the constant voltage source of the limiter of FIG. 6.

In the embodiment described above, the limiter circuit 25 is provided with constant voltage sources V22 and V2. However, as shown in FIG. 7, this arrangement may be replaced with a constant voltage source of 5 V, for example, which is arranged to be voltage divided by means of resistors R62 and R63. In this instance, the resistor R63 is adjustable according to the maximum aperture F-number of the lens to obtain a voltage corresponding to the maximum aperture value. The other resistor R62 is adjustable according to a small aperture F-number to obtain a voltage corresponding to the small aperture value. Therefore, the program lines can be adjusted when the lens is replaced with another lens.

Figure 8:
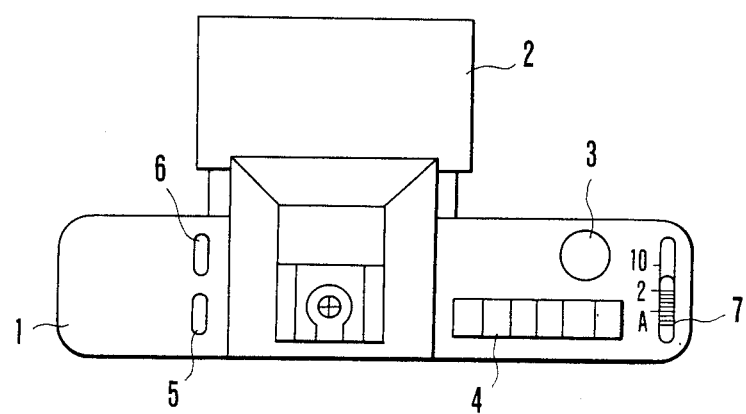
FIG. 8 is a plan view showing a multi-programed automatic exposure control camera as another embodiment of the invention.

Further, in the embodiment described, the self-timer modes are arranged to be selected by depressing the button 5 in the same manner as in the case of other modes. However, as shown in FIG. 8, this may be replaced by different arrangement in which a sliding operation member 7 is arranged to have the program modes other than the self-timer modes selected when the member 7 is adjusted to a mark "A"; and to have each of the self-timer modes selected when the member 7 is adjusted to a mark "2" of "10". Thus, in selecting the modes other than the self-timer modes, the member 7 is adjusted to the mark "A" and then the button 5 is depressed to effect switch-over from one mode to another with the mode displayed at the display part accordingly. In selecting each of the self-timer modes, the member 7 is adjusted to the mark "2" or "10" to select either the above-stated 2 sec self-timer mode or the 10 sec self-timer mode.

Figure 9:
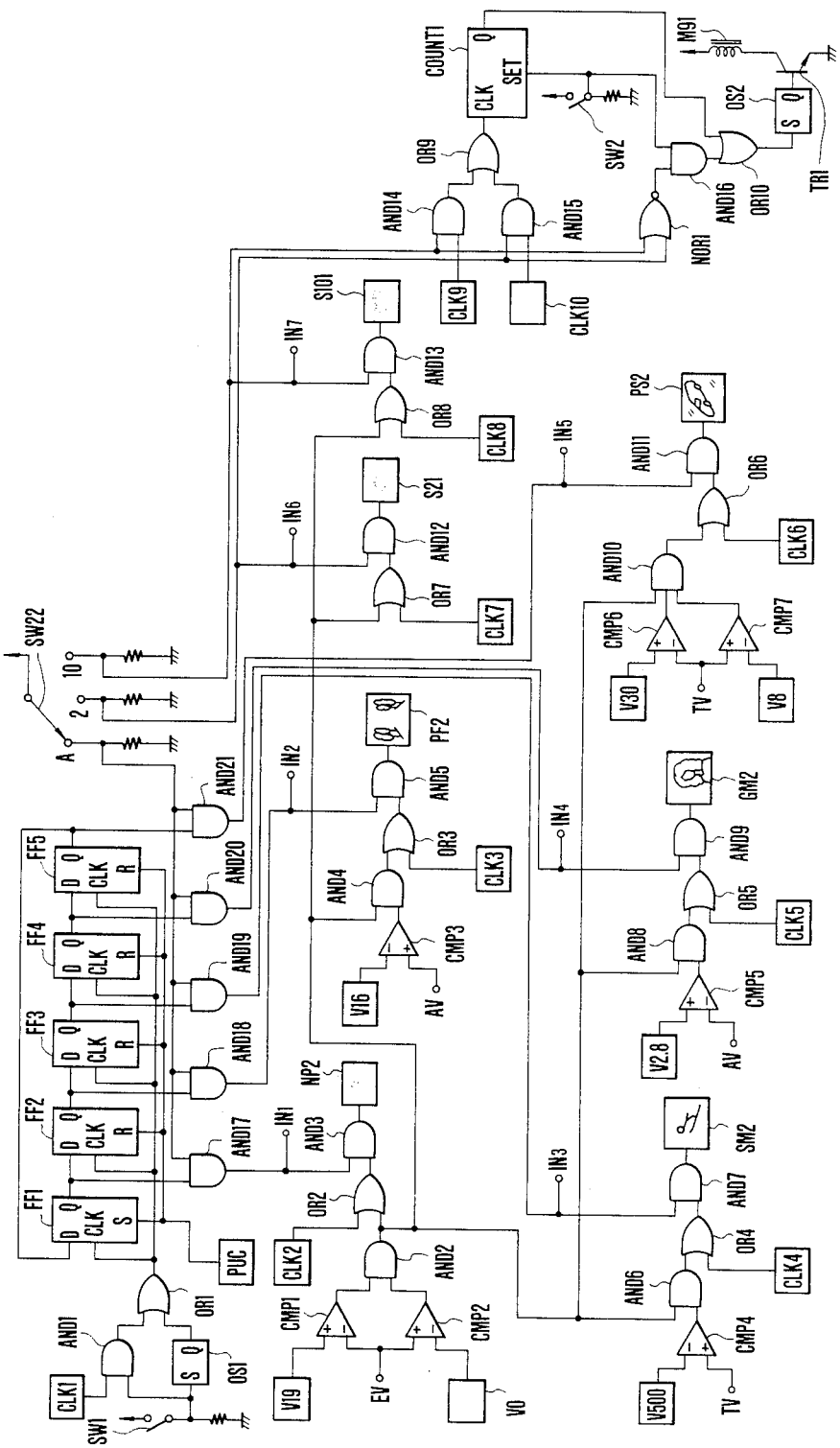
FIG. 9 is a circuit diagram showing the control circuit arrangement of the camera shown in FIG. 8.

FIG. 9 shows by way of example the arrangement of the control circuit applicable to the mode selecting arrangement shown in FIG. 8. In FIG. 9, the parts which are the same as those shwon in FIG. 5 is indicated by the same reference symbols and numerals. In this case, AND gates AND17-AND21 are connected to the flip-flop circuits FF1-FF5; and a switch SW22 is arranged to have its position shifted to a terminal A when the above-stated member 7 is adjusted to the mark "A", to a terminal 2 when the member 7 is adjusted to the mark "2" and to another terminal 10 when the member 7 is adjusted to the mark "10". This represents a point in which this embodiment differs from the embodiment shown in FIG. 5. Such being the difference, in the case of FIG. 9, a high level input is impressed on one of the input terminals of one of the AND gates AND-17-AND21 when the member 7 is adjusted to the mark "A". Then, the output terminal Q of one of the flip-flop circuits FF1-FF5 produces an output to select thereby the normal program, pan focus, panning, stop motion or gradate mode. When the switch SW22 shifts from the terminal A to the terminal 2, the AND gates AND-17-AND21 become inoperative. This inhibits the selection of the above-stated modes and the display circuit S21 comes to light up to indicate selection of the 2 sec self-timer mode. When the switch SW22 shifts to the terminal 10, the display circuit S101 comes to light up to indicate selection of the 10 sec self-timer mode.

Figure 10:
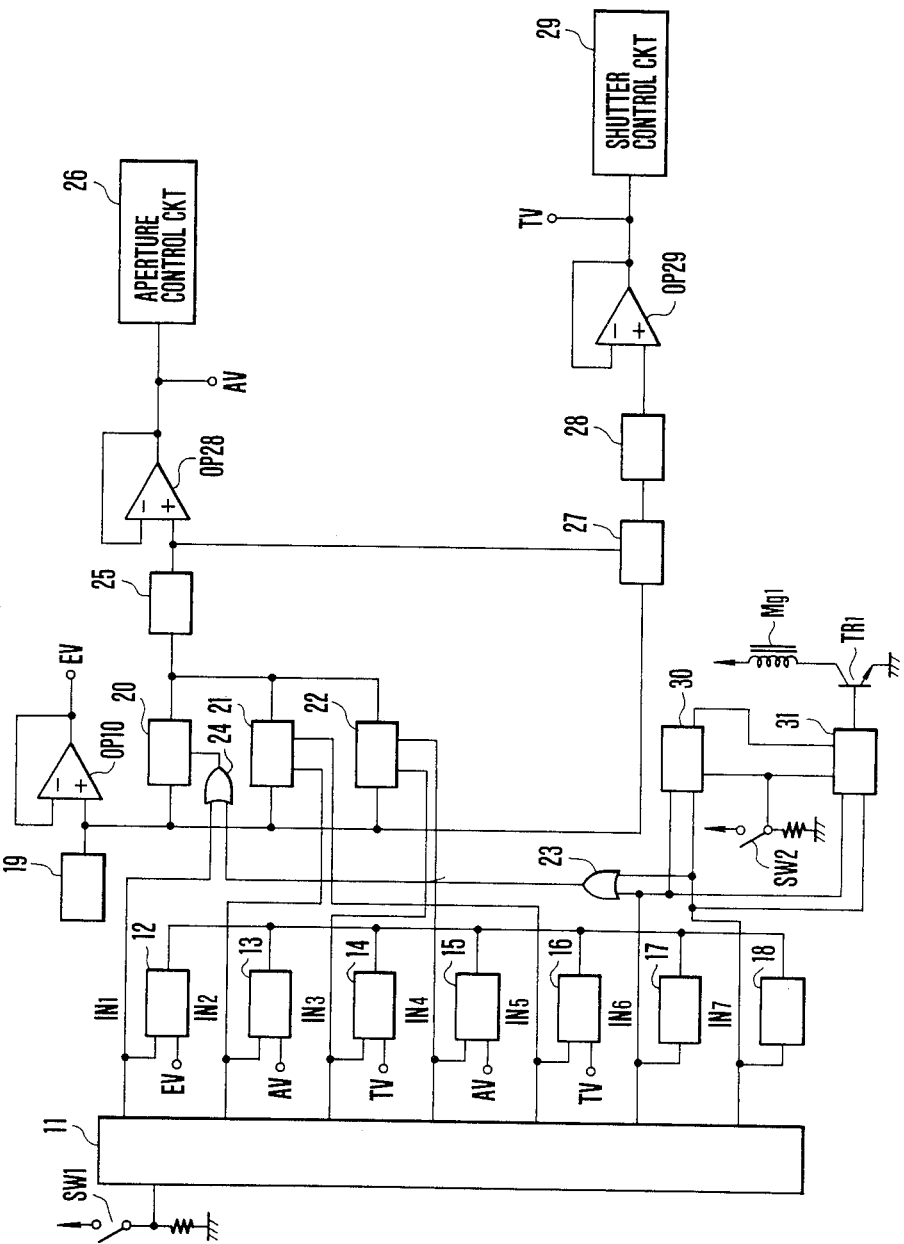
FIG. 10 is a circuit diagram showing a camera of a further embodiment of the invention.

FIG. 10 is a circuit diagram showing another embodiment of the invention. In FIG. 10, the components which are identical with those shown in FIG. 4 are indicated by the same reference symbols and numerals. The difference of this embodiment from the embodiment shown in FIG. 4 resides in that: the normal program line selection circuit 20 is arranged, in this case, to have signals IN6 and IN7 supplied thereto via OR tates OR23 and OR24 in addition to the signal IN1. In the event of 2 sec self-timer mode or the 10 sec self-timer mode, the normal program line C of FIG. 2 is selected and a self-timer photographing operation is thus arranged to be carried out in the normal program mode.

Figure 11:
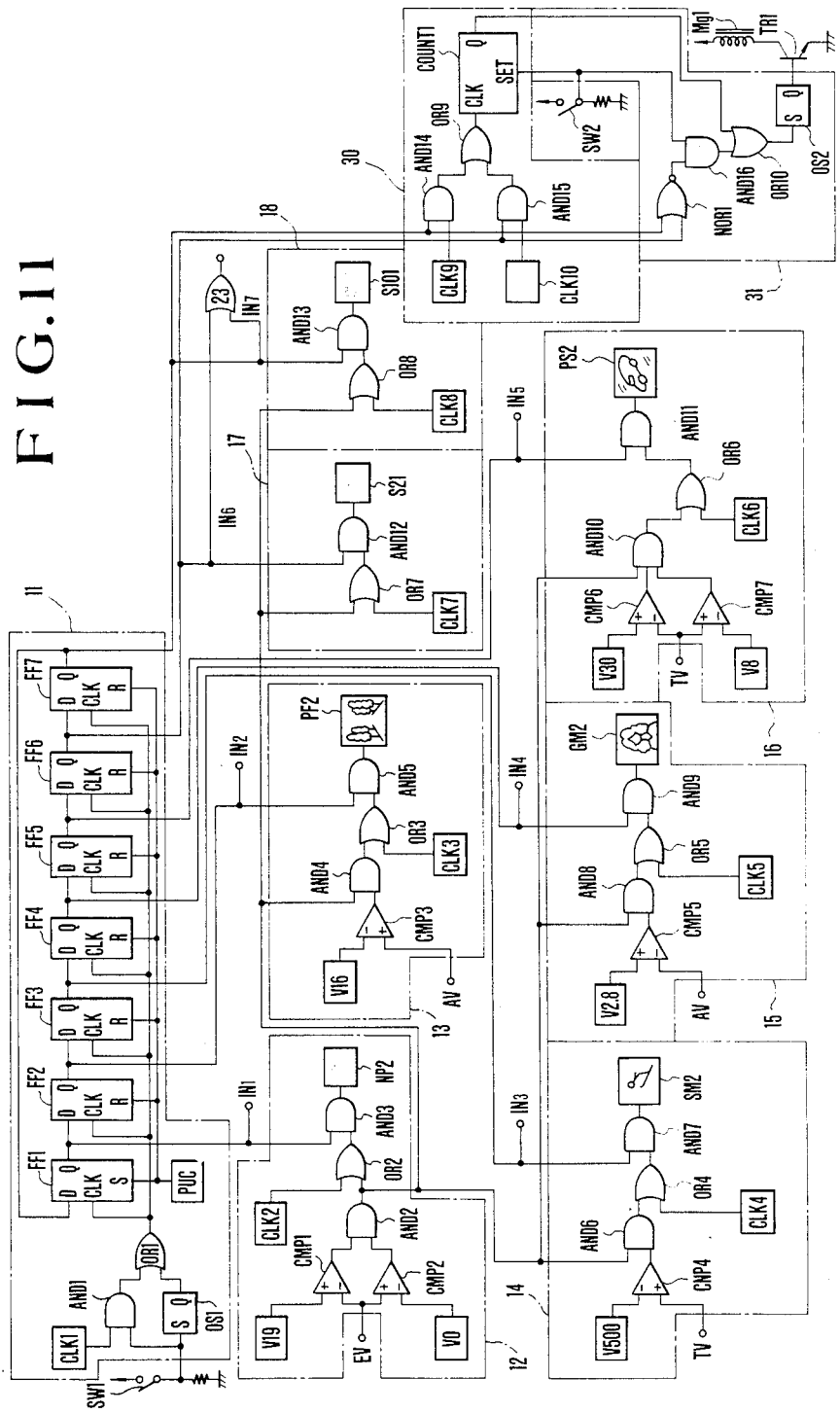
FIG. 11 is a circuit diagram showing the details of a switching circuit, a display driving circuit and a release circuit shown in FIG. 10.

FIG. 11 shows the details of the components shown in FIG. 10 including a selection signal generating circuit 11, display driving circuits 12-18, a timer circuit 30 and a release driving circuit 31. The circuit arrangement shown in FIG. 11 is almost identical with that of FIG. 5. Therefore, the parts which are identical with those shown in FIG. 5 are indicated by the same reference symbols and numerals and are omitted from description here. However, FIG. 11 differs from FIG. 5 in that the outputs of the output terminals Q of the flip-flop circuits FF6 and FF7 are arranged to be supplied to the OR gate OR23. In the case of FIG. 11, the embodiment operates as follows: A different mode is selected every time the switch SW1 is pushed down in the same manner as in the case of FIG. 5. The display circuit then displays each mode selected. In the event of selection of one of the self-timer modes, however, a high level input is supplied to the normal program line selection circuit 20 via the OR gate OR23 and thus the normal program line is selected for the self-timer mode. This differs from the embodiment shown in FIG. 5.

Figure 12:
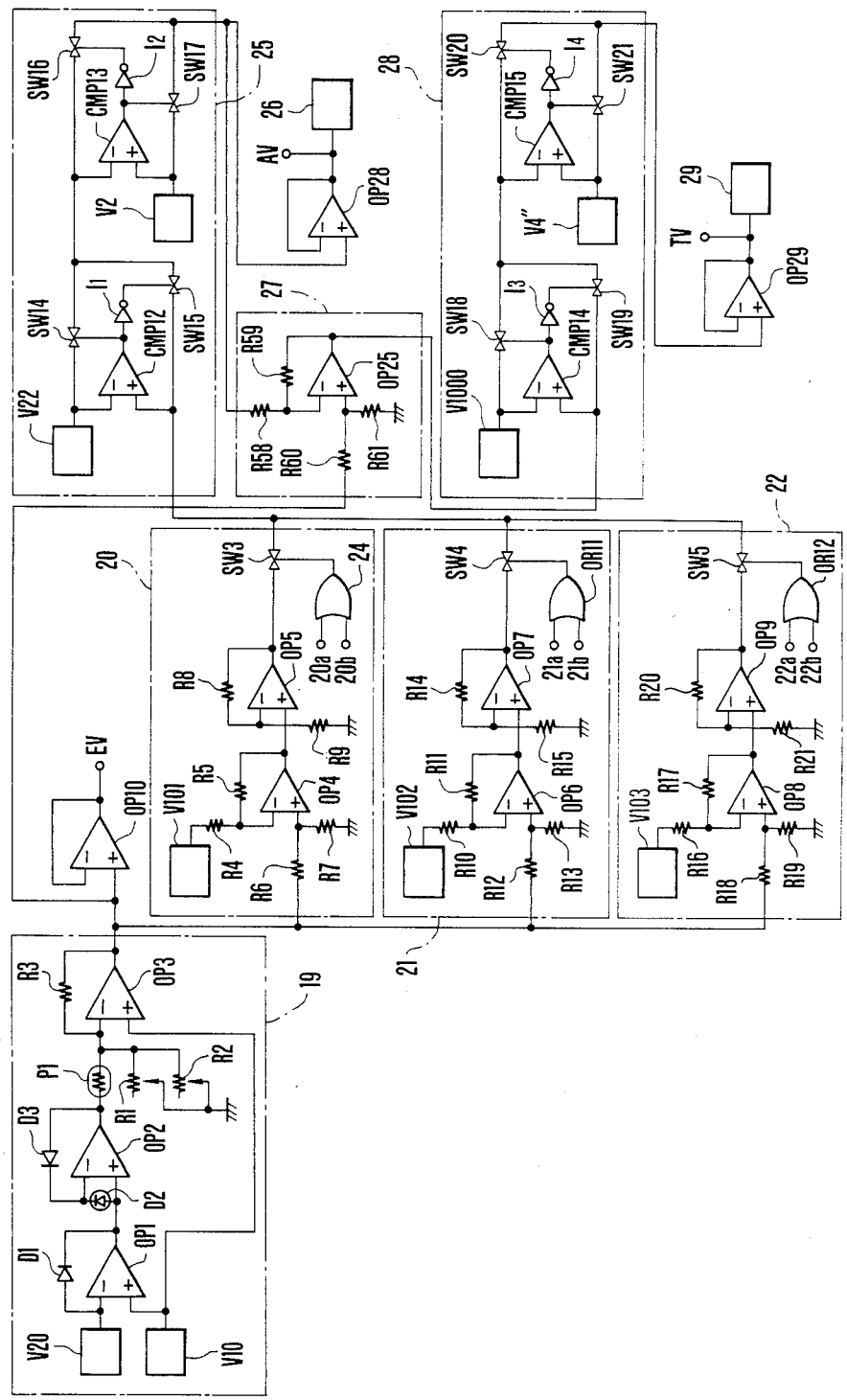
FIG. 12 is a circuit diagram showing the details of a selection circuit and a limiter circuit shown in FIG. 10.

FIG. 12 shows the details of the components of the circuit arrangement shown in FIG. 10 including a light measuring circuit 19, a normal program line selection circuit 20, a pan focus program and panning shot program selection circuit 21, a stop motion and gradate mode program selection circuit 22, limiter circuits 25 and 28, a subtraction circuit 29, an aperture control circuit 26 and a shutter control circuit 29. In FIG. 12, the parts which are identical with those of the embodiment shown in FIG. 6 are indicated by the same reference symbols and numerals. The operation of these components is identical with that of the embodiment shown in FIG. 6 and thus requires no further description with the exception of the operation for the 2 sec and 10 sec self-timer modes. In the event of selection of the 2 sec self-timer mode or the 10 sec self-timer mode, the normal program line selection circuit 20 comes to operate and thus exposure control is accomplished according to the normal program line C of FIG. 2 for the self-timer mode selected. In other words, with the 2 sec or 10 sec self-timer mode selected, the OR gate OR23 of FIG. 11 produces a high level signal. The high level signal is supplied to an OR gate OR24 of FIG. 12 via a terminal 20b to selectively turn on switch SW3. Therefore, in the 2 sec or 10 sec self-timer mode, the exposure control is carried out according to the normal program line.

Figure 13:
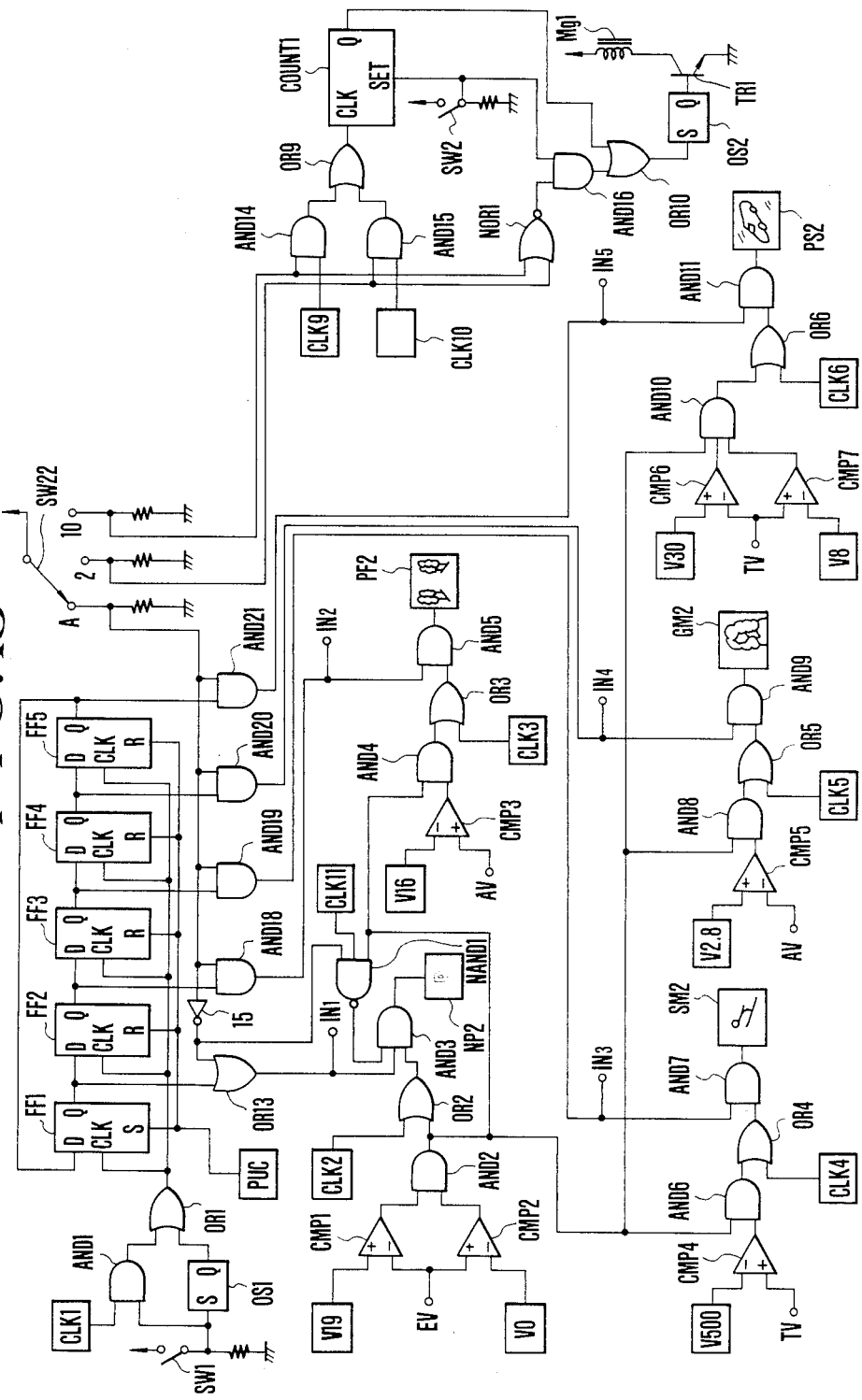
FIG. 13 is a circuit diagram showing a switching circuit, a display driving circuit and a release circuit arranged as another embodiment of the invention.

In case that the self-timer modes is arranged to be selected by means of the self-timer mode selecting member 7 as shown in FIG. 8 with the member 7 included in the embodiment shown in FIGS. 10, 11 and 12, the embodiment becomes as shown in FIG. 13. In this case, the mode selection display circuit is modified as shown in FIG. 13 in which: The embodiment includes a switch SW22 which is responsive to the operation of the member 7; AND gates AND18-AND21; an OR gate OR13; an inverter 15; a NAND gage NAND1; and an oscillator CLK11. In FIG. 13, the circuit elements other than those mentioned above are identical with those shown in FIG. 11 and are indicated by the same reference symbols and numerals. These identical circuit elements are omitted from description here.

In the circuit of FIG. 13, the switch SW22 is connected to a terminal or a contact A when the member 7 is adjusted to the mark "A". In this instance, a high level input is impressed on one of the input terminals of each of the AND gates AND18-AND21. Then, the output level of the inverter 15 becomes low.

In cases where the normal program is selected under this condition, the output of the output terminal Q of the flip-flop FF1 causes the display circuit NP2 to light up. When the stop motion mode or the gradate mode is selected, the output of one of the flip-flop circuits FF2-FF5 is transmitted via the above-stated AND gate to an applicable display circuit to cause it to display the mode selected.

In the event of selection of the 2 sec self-timer mode or the 10 sec self-timer mode with the member 7 adjusted to the mark "2" or "10", the switch SW22 comes to be connected to another contact 2 or 10. Then, AND gates AND18-AND21 produce low level outputs and the inverter 15 comes to produce a high level output. If the brightness of the object to be photographed is within a range of exposure values EV19-EV0, the NAND gate NAND1 then comes to open to allow thereby the pulses from the pulse oscillator CLK11 to be transmitted to the AND gate AND3. As a result, the display circuit NP2 flickers in synchronism with the pulses from the pulse oscillator CLK11 to indicate thereby the selectiion of the self-timer mode.

Figure 14:
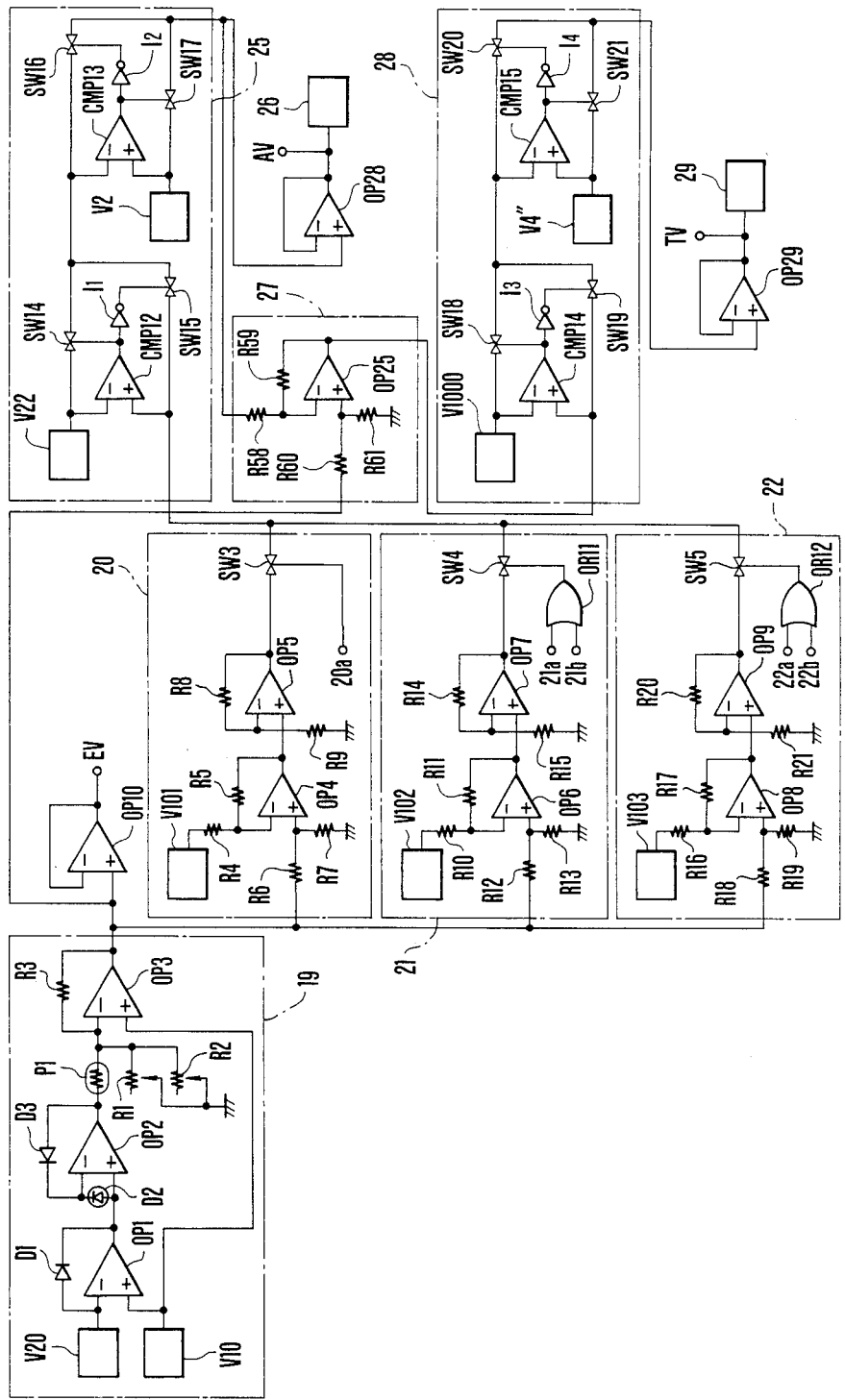
FIG. 14 is a circuit diagram showing by way of example selection circuits to be selected by the switching circuit shown in FIG. 13.

Further, in this case, if the brightness is either above the exposure value EV19 or below the exposure value EV0, the display circuit NP2 flickers in synchronism with pulses produced from another oscillator CLK2. However, since these oscillators CLK11 and CLK2 are arranged to produce pulses at different periods of frequency, the display flicker by the oscillator CLK2 which is intended to give a warning is clearly distinguishable from the display flicker which is intended for displaying the self-timer mode. With the display switch-over circuit arranged as shown in FIG. 13, each of the mode selection circuits are arranged as shown in FIG. 14. Referring to FIG. 14, the output of the OR gate OR13 of FIG. 13 is arranged to be impressed on the terminal 20a of the normal program line selection circuit 20.

The arrangement of circuits shown in FIG. 14 is identical with those of the embodiment shown in FIG. 12 and, therefore, requires no further description.

In accordance with this invention as described in the foregoing, in the event of self-timer photography, an exposure control mode is automatically selected to obtain such an aperture or shutter time that gives an image effect suited for self-timer photography. Therefore, the invention gives a great advantage in carrying out a self-timer photographing operation with a camera of the type having various photographing modes.

What We claim:

1. A camera having a plurality of exposure control modes, comprising:
  (a) self-timer photography selecting means for selecting self-timer photography;
  (b) an exposure control circuit having a first program mode for controlling shutter time and aperture values according to a program line on the basis of the intensity of brightness and a second program mode for controlling shutter time and aperture values according to a program line different from said program line of the first program mode; and
  (c) operation control means for exposure control operations, said means being arranged to perform an exposure control operation in said first program mode in response to a shutter release operation when self-timer photography is not selected by said self-timer photography selecting means and to perform in said second program mode an exposure control operation after the lapse of a predetermined self-timer time following a shutter release operation when self-timer photography is selected by said self-timer photography selecting means.

2. A camera having a plurality of exposure modes, comprising:
   (a) an exposure control circuit having a plurality of exposure modes including at least a non-self-timer exposure mode in which a shutter time value and an aperture value are controlled on the basis of a program line provided for the mode and a self-timer exposure mode in which a shutter time value and an aperture value are controlled and adjusted to values suited for self-timer exposure on the basis of a program line different from said program line provided for the non-self-timer exposure mode; and
   (b) exposure selecting means for selecting said exposure modes, the shutter time and the aperture value being controlled in the self-timer exposure mode when said mode is selected by said exposure selecting means.

3. A camera having a plurality of exposure modes, comprising:
   (a) an exposure control circuit having a plurality of exposure modes including a self-timer exposure mode in which an exposure factor is regulated for a self-timer exposure;
   (b) mode selecting means for selecting one of said exposure modes; and
   (c) self-timer exposure mode selecting means for selecting said self-timer exposure mode, an exposure control operation being arranged to be carried out in said self-timer exposure mode irrespective of an exposure mode selected by said mode selecting means when a self-timer exposure mode is selected by said self-timer exposure mode selecting means.

4. A camera having a self-timer mode, comprising:
   (a) an exposure control circuit having a self-timer mode in which an aperture is restricted within a wider opening aperture range by an exposure control restricting part; and
   (b) self-timer photographing selecting means for selecting self-timer photography, exposure control being arranged to be carried out in said self-timer mode when self-timer photography is selected by said selecting means.

5. A camera comprising:
   (a) an exposure control circuit having a plurality of exposure control modes including a first self-timer exposure control mode in which an exposure factor is restricted to a value suited for normal self-timer photography and a second self-timer exposure control mode in which the exposure factor is restricted to a value suited for close-up photography;
   (b) a self-timer circuit arranged to allow an exposure operation to begin after the lapse of a predetermined self-timer time from a shutter release operation, said circuit having a first self-timer time and a second self-timer time which is shorter than said first self-timer time; and
   (c) self-timer time selecting means for selecting the self-timer time, said first self-timer exposure control mode being selected to carry out an exposure operation in said first mode when said first self-timer time is selected, said second self-timer exposure control mode being selected to carry out an exposure operation in said second mode when said second self-timer time is selected.

6. A camera having a self-timer photography mode, comprising:
   (a) an exposure control circuit having a first exposure control mode for controlling an exposure factor and a second exposure control mode, said second exposure control mode being arranged to restrict said exposure factor to a value which is suited for self-timer photography and differs from a value controlled by said first exposure control mode; and
   (b) self-timer selecting means for selecting self-timer photography, said second exposure control mode of the exposure control circuit being selected when self-timer photography is selected by said self-timer selecting means.

7. A camera comprising:
   (a) an exposure control circuit having a first exposure control mode in which an exposure factor is adjusted to a predetermined value according to the brightness of an object to be photographed and a second exposure control mode in which a part having an exposure control characteristic to adjust an aperture to a value within a wider open aperture range than in the case of the first mode is operated;
   (b) mode selecting means for selecting said first or second mode;
   (c) a self-timer arranged to allow an exposure operation to begin after the lapse of a predetermined period of time from a shutter release operation; and
   (d) self-timer selecting means for selecting a mode in which a self-timer photographing is performed with said self-timer, said exposure control circuit being arranged to perform exposure control in said second mode when the self-timer photographing mode is selected by said self-timer selecting means.

8. A camera comprising:
   (a) an exposure control circuit having a plurality of automatic exposure control modes including a first mode; and
   (b) selecting means for manually selecting one of said automatic exposure control modes including said first mode, said first mode being arranged to be selectable directly by said selecting means and to be selected in the event of self-timer photography.

* * * * *